United States Patent
Ohya et al.

(10) Patent No.: US 8,834,092 B2
(45) Date of Patent: Sep. 16, 2014

(54) FLUID MACHINE, WIND TURBINE, AND METHOD FOR INCREASING VELOCITY OF INTERNAL FLOW OF FLUID MACHINE, UTILIZING UNSTEADY FLOW

(75) Inventors: Yuji Ohya, Fukuoka (JP); Takashi Karasudani, Fukuoka (JP); Kimihiko Watanabe, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 480 days.

(21) Appl. No.: 13/259,209

(22) PCT Filed: Mar. 15, 2010

(86) PCT No.: PCT/JP2010/001809
§ 371 (c)(1),
(2), (4) Date: Dec. 9, 2011

(87) PCT Pub. No.: WO2010/109800
PCT Pub. Date: Sep. 30, 2010

(65) Prior Publication Data
US 2012/0086216 A1 Apr. 12, 2012

(30) Foreign Application Priority Data
Mar. 24, 2009 (JP) .................................. 2009-072293

(51) Int. Cl.
*F03D 1/04* (2006.01)
*F03B 13/26* (2006.01)

(52) U.S. Cl.
CPC . *F03D 1/04* (2013.01); *Y02E 10/28* (2013.01); *F05B 2240/133* (2013.01); *F05B 2260/99* (2013.01); *F03B 13/264* (2013.01); *Y02E 10/721* (2013.01); *F05B 2240/122* (2013.01); *Y10S 415/908* (2013.01); *Y10S 416/02* (2013.01)
USPC ................. 415/1; 415/4.3; 415/4.5; 415/908; 416/DIG. 2

(58) Field of Classification Search
USPC ......... 415/1, 2.1, 3.1, 4.1, 4.3, 905, 906, 908, 415/220, 221, 222, 228, 144, 145, 182.1; 416/179, 189
See application file for complete search history.

(56) References Cited

U.S. PATENT DOCUMENTS 4,021,135 A * 5/1977 Pedersen et al. ............ 415/208.2
4,132,499 A * 1/1979 Igra ............................. 415/210.1
(Continued)

FOREIGN PATENT DOCUMENTS

JP 2003-278635 A 10/2003
JP 2004-144001 A 5/2004
(Continued)

OTHER PUBLICATIONS

Yuji Ohya et al., "Development of a Shrouded Wind Turbine Equipped with a Compact Brimmed Diffuser", Proceedings of National Symposium on Wind Engineering, vol. 19 (2006), pp. 163-168, available at https://www.jstage.jst.go.jp/browse/kazekosymp/19/0/_contents.
(Continued)

*Primary Examiner* — Edward Look
*Assistant Examiner* — Eldon Brockman
(74) *Attorney, Agent, or Firm* — Sughrue Mion, PLLC

(57) ABSTRACT

A fluid machine, a wind turbine, and a method for increasing velocity of an internal flow is provided. A basic shape of the casing has a cycloid curve having a convex portion at a throat section between the front and rear edges. The throat section and a vortex generating face disposed downstream of the throat section to generate the negative pressure region are formed on an inner circumferential face of the casing. A first outflow gradient is formed on an outer circumferential face of the casing and at the rear edge. A second outflow gradient is formed on a boundary of a throat-side adjacent face adjacent to the vortex generating portion to separate the internal flow. The negative pressure region of high vorticity is generated behind the vortex generating face by virtue of the non-streamline shaped casing to increase the velocity of the internal flow.

17 Claims, 22 Drawing Sheets

(56) References Cited

U.S. PATENT DOCUMENTS

| | | | |
|---|---|---|---|
| 4,720,640 A | 1/1988 | Anderson et al. | |
| 2005/0069415 A1 | 3/2005 | Ferracani | |
| 2009/0257862 A2* | 10/2009 | Presz et al. | 415/116 |
| 2010/0028132 A2* | 2/2010 | Presz et al. | 415/116 |
| 2011/0042952 A1* | 2/2011 | Ohya et al. | 290/52 |

FOREIGN PATENT DOCUMENTS

| | | | |
|---|---|---|---|
| JP | 2006-152854 A | 6/2006 | |
| WO | 2004/099607 A2 | 11/2004 | |
| WO | 2007/148826 A1 | 12/2007 | |
| WO | 2009/063599 A1 | 5/2009 | |

OTHER PUBLICATIONS

International Search Report (PCT/ISA/237) dated May 25, 2010, in International Application No. PCT/JP2010/001809.

Supplementary European Search Report, dated Apr. 8, 2014, issued by the European Patent Office in counterpart European Application No. 10755604.5.

* cited by examiner

FLUID MACHINE, WIND TURBINE, AND METHOD FOR INCREASING VELOCITY OF INTERNAL FLOW OF FLUID MACHINE, UTILIZING UNSTEADY FLOW

TECHNICAL FIELD

The present invention relates to a fluid machine operated with internal and external flows and utilizing an unsteady flow, a wind turbine which carries out high output power generation by increasing the velocity of the internal flow caused by wind in the atmosphere, and a method for increasing the velocity of the internal flow of the fluid machine.

BACKGROUND ART

In recent years, global-scale environmental issues including global warming or energy issues including the start of the depletion of energy resources, such as oil, which were once believed inexhaustible are being recognized worldwide.

Under these circumstances, wind power generation not emitting $CO_2$ is attracting lots of attention as energy producing means for resolving both the environmental and energy issues. However, a wind power generation apparatus, even a large wind turbine regarded to have high efficiency, can only convert approximately 40% of the kinetic energy of the wind flowing inside the wind turbine into electric power. If the amount of this conversion is improved, the wind power generation will occupy a more important place in the environmental and energy issues.

However, most of conventional wind turbines have an impeller exposed in the atmosphere, and there are many wind turbines installed in the peripheries of airports, for example. In the periphery of such an airport, an aviation Doppler radar is installed to monitor the movements of airplanes; however, the rotation of the wind turbines is frequently misidentified as the approach or taking off of small airplanes. This is recognized as a serious problem in regional airports in Europe and America, where many wind turbines are used in particular. However, a clue about how to solve this problem has not been found in the conventional wind turbines.

As a problem similar to this, there is a problem of bird strikes. The more the demand for wind turbines rises and the more the number of wind turbines increases, the more the frequency of flying birds being sucked into the impellers. Collecting broken impellers leads to reduction in the operating rate of the wind power generation and lowers the amount of contribution of the wind power generation to power supply.

The output of the wind power generation is proportional to the cube of wind velocity. Hence, when a wind turbine is installed, a windy district is selected as a location, and efforts have been made to collect wind as much as possible, to increase the velocity of the wind and to increase the amount of power generation. Accordingly, attention has been paid to improvement in the wind collector on the inlet side of a wind power generation apparatus, the impeller, the diffuser, etc. of the apparatus, and measures have been taken to improve the energy conversion efficiency thereof as much as possible. All these are assumed to be an extension of conventional turbo machines and the measures have been taken accordingly. Hence, there was a limit as a matter of course.

Under these circumstances, the inventors of the present invention and other researchers challenged the above-mentioned common knowledge about the wind power generation apparatus (see Patent Document 1). More specifically, they reached a viewpoint that it is not required to be obsessed with the conventional thinking of a streamline shape and a steady flow, provided that high output power generation can be attained. Conventional fluid machines are based on a streamline shape and a steady flow that are easy to analyze, and it is no exaggeration to say that there is no turbo machine that uses a non-streamline shape (bluff body) and an unsteady flow. However, even the non-streamline shape and the unsteady flow can serve the intended purpose of the machine, provided that a stable flow can be accomplished, that the velocity of an internal flow can be increased so as to be higher than that of a conventional flow, and that the flow can be improved. The streamline shape and the non-streamline shape are herein defined. The streamline shape is a shape according to which a flow does not substantially separate from the surface within a range of Reynolds number Re used in a fluid machine, and the non-streamline shape is a shape other than the streamline shape and in which the separation occurs.

Hence, to accomplish this, the inventors of the present invention proposed a wind power generation apparatus disclosed in Patent Document 1. This wind power generation apparatus is provided with a cylindrical wind tunnel body and a power-generating wind turbine disposed in the vicinity of the wind inlet of the wind tunnel body and adopts a configuration in which outside the edge of the outflow port of the wind tunnel body, a flat flange perpendicular to the flow direction of wind is provided to generate strong vortices therebehind when the wind flowing outside the wind tunnel body collides therewith. The wind tunnel body is an expanding tube, so to speak, a tube simply expanding from the installation position of the impeller to the outflow port, and the flange has a width of 10 to 100% of the minimum inside diameter of the wind tunnel body.

Providing this kind of flange (a ring) against the flow to form vortices is beyond the common knowledge on the conventional fluid machines. The vortices formed behind the flange are formed as the so-called Karman vortices generated alternately around the inner and outer circumferences being concentric with the ring on the downstream of the ring; the vortices are generated alternately (unsteadily) at certain timings and reduce the pressure in the vicinity of the outflow port of the wind tunnel body, whereby the difference in pressure improves the velocity of the internal flow.

It should be said that this configuration of the wind power generation apparatus has created a new category (a type of fluid machine having a non-streamline shape) in wind power generation apparatuses or fluid machines in which the entire flow around the fluid machine is controlled by the vortices generated on the outflow side, whereby strong wind is pulled into the apparatus and allowed to flow along the inner wall surface thereof to the outflow port so that the velocity of the flow is increased efficiently. This flow having the increased velocity can generate higher output power than that obtained by the conventional apparatus.

PRIOR ART DOCUMENT

Patent Document 1: JP 3621975 B2

SUMMARY OF THE INVENTION

Problem to be Solved by the Invention

However, the wind power generation apparatus of Patent Document 1 proposes an embryonic idea in which outside the outflow port of the wind tunnel body, a vertical flat flange is provided to generate strong vortices therebehind when the wind flowing outside the wind tunnel body collides therewith. This technology is still in the state of a raw stone from the viewpoint of controlling the flow around a fluid machine having a non-streamline shape, more specifically, the flow around a casing having a non-streamline shape and covering the fluid machine. The casing is herein basically a non-rotating structure for covering the circumference of the impeller and is a component of the fluid machine according to Patent Document 1 in which the wind tunnel body and the flange are provided.

In order that the fluid machine further advances so as to become a promising fluid machine in the future, it is necessary to further investigate the nature of the flow around a non-streamline shape, to clarify the characteristics of the flow and to improve velocity increasing characteristics using the casing. For this purpose, it is necessary to form strong vortex streets in the flow around the non-streamline shape using the casing and to locally form a strong negative pressure region at the outlet of the fluid machine so that the internal flow becomes stable. Furthermore, it is not sufficiently clarified which shape the casing should have to accomplish this kind of flow. It is apparent that it is difficult to obtain a casing having such an optimal shape because the occurrence of vortices is a phenomenon in which nonlinearity appears significantly in fluid dynamics.

Furthermore, the inventors of the present invention already proposed a control technology for stabilizing the flow of vortex streets around the casing having a non-streamline shape (PCT/JP2008/003187 published as WO 2009/063599 A1). This will be described. The flow along the surface of the non-streamline shape is usually separated on the downstream side depending on its Reynolds number Re. However, this separation does not occur neatly along one line in the circumferential direction orthogonal to the flow, but has strong and weak fluctuations (vortex street fluctuations) in terms of a vortex fluctuation scale, and the vortices generated by the separation at the position of the strong fluctuations are stronger than those generated at other positions. The flow around an object having a non-streamline shape cannot be utilized unless the entire flow accompanied by the vortices is stabilized; hence, in this control technology, a proposal was made in which a vortex generator is provided on the downstream side of the casing and a phase controller is further provided, whereby the phase depending on which the vortex formation fluctuates is adjusted in the circumferential direction inside the rear end face area, the cell structure of the flow is clarified, and its position is fixed. In the proposal of the prior application by the inventors of the present invention, an invention is described using an embodiment in which a flange serving as a vortex generator is installed on the downstream end of a rotary casing. This flange is installed, so to speak, as an object for simply blocking the external flow so that the rotary casing has a non-streamline shape; more accurately, the flange is just used as means for causing separation in the flow therearound and forming Karman vortex streets arranged in the circumferential direction on the downstream side. Hence, the proposal of the prior application disclosed a technology in which for the downstream formed behind the object that blocked the flow, the flow of the vortex streets is stabilized in the circumferential direction of the casing under this assumption. This does not disclose non-streamline shape conditions for forming the strongest and stable vortex street flow themselves, that is, optimal casing shape conditions for forming the strongest and stable vortex street flow by allowing a casing having a non-streamline shape to optimally control the phenomenon of flow separation and unsteady flow.

The above-mentioned prior application technology of the inventors of the present invention is similar but different from the boundary layer control technology and the current plate that have been known conventionally. More specifically, the conventional boundary layer control technology and the conventional current plate are used to prevent a boundary layer from being separated from the surface of an object; however, this control technology is used not to prevent separation but to allow the flow to be separated sufficiently, whereby the entire vortex flow generated is ordered and stabilized. Vortices are generated instead of being prevented, and the flow after the generation is controlled.

However, if the entire unsteady flow can be ordered and stabilized by adjusting the phase of fluctuations depending on the shape of the nonlinear casing itself without providing the phase controller, further advanced control for the unsteady flow can be performed together with the above-mentioned new control technology. This is based on an idea quite different from that of the casing of the conventional fluid machine. More specifically, not only the technology for stabilizing an unsteady flow in the non-streamline shaped casing having a determined shape as in the case of the above-mentioned prior application technology but also the shape of the non-streamline shaped casing itself capable of utilizing an unsteady flow most efficiently should be pursued. It is certain that vortex streets can be generated by blocking the flow; however, this is quite different from the non-streamline shaped casing capable of using an unsteady flow to the utmost limit. If the casing is simply formed into a non-streamline shape, an unnecessary pressure loss occurs, the intensity of the vortices of the vortex streets is not increased, and a negative pressure region having strong negative pressure is not generated definitely.

This casing is basically different from the casing of the conventional fluid machine intended to reduce resistance in a steady flow; proper performance as a whole is considered without prepossessed with a direct demerit, i.e., separation, and the casing is intended to satisfy the performance. It is certain that a non-streamline shape has higher resistance and this demerit is usually significant; however, such a non-streamline shape has other excellent characteristics, for example, a characteristic in which high output is obtained from a fluid machine; and if the characteristics outweigh the demerit, the casing should be adopted without hesitation.

Furthermore, wind power generation apparatuses are demanded so as to be made larger. If the wind power generation apparatus of Patent Document 1 is made larger, its diffuser becomes longer (an inclination angle of 5 to 25°) and its weight increases. In the cases of micro and mini wind turbines equipped with impellers having a diameter of several meters or less, the increase in weight is allowable; however, in the case of large wind power generation apparatuses having a power generation capacity of megawatt, being planned to be developed in the future, the impeller is assumed to have a diameter of ten meters to several ten meters; if the diffuser proposed previously is used its weight becomes unallowably heavy. In the case that the apparatus is made larger to the megawatt class, it is inevitable that its wind tunnel body should be made compact. At this time, if the velocity of the internal flow can be increased by only changing the shape of the casing, the wind power generation apparatus can be made compact and lightweight while delivering high output.

In addition, most of conventional wind turbines have an impeller exposed in the atmosphere, and numerous wind turbines are installed in the peripheries of areas with few barriers, such as airports. In the periphery of such an airport, an aviation Doppler radar is installed to monitor the movements of airplanes. Conventionally, the aviation Doppler radar frequently misidentifies wind turbines as small airplanes that are approaching or taking off. Furthermore, the problem of bird strikes is important as a problem from a practical standpoint to raise the operating rates of the wind turbines.

These problems occur when wind power generation apparatuses are put to practical use, and are unavoidable and must be solved so that wind power generation apparatuses play a role in power supply as next generation infrastructure and are used more extensively in the society.

Accordingly, an object of the present invention is to provide a fluid machine utilizing an unsteady flow, according to which a casing can be designed and produced easily, and by virtue of the shape of the casing, a strong and stable vortex street flow is formed in the flow, a strong negative pressure region is made in the vicinity of the casing on the outlet side thereof, and the velocity of an internal flow is increased by an external flow.

Furthermore, another object of the present invention is to provide a wind turbine according to which a casing can be designed and produced easily, and by virtue of the shape of the casing, a strong and stable vortex street flow is formed in the outside wind, a strong negative pressure region is made in the vicinity of the casing on the outlet side thereof, the velocity of influent wind is increased, the size can be made larger with a short flow passage, and high output power generation can be performed.

Moreover, still another object of the present invention is to provide a method for increasing the velocity of the internal flow of a fluid machine, according to which a casing can be designed and produced easily, and by virtue of the shape of the casing, a strong and stable vortex street flow is formed in the flow, a strong negative pressure region is made in the vicinity of the casing on the outlet side thereof, and the velocity of the internal flow is increased by the external flow.

Means for Solving the Problem

According to the present invention, a fluid machine and a wind turbine utilizing an unsteady flow is provided. The fluid machine includes a casing having an annular shape and an axial cross-section of a non-streamline shape, and an impeller disposed at a throat section inside the casing to rotate around an axis. The fluid machine is configured to split a surrounding flow into an internal flow and an external flow at a front edge and to force the flows to cause separations, such that vortex streets are formed downstream of the casing by the separations, and a negative pressure region having a cell structure in an annular direction is formed by the vortex streets and vortex street fluctuations, whereby a velocity of the internal flow inside the casing is increased. It is primarily characterized in that a reference line serving as a reference for forming the thickness of the casing connects the front edge and a rear edge in the axial cross-section, and includes a cycloid curve having a convex portion at the throat section between the front and rear edges. The throat section and a vortex generating portion disposed downstream of the throat section to generate the negative pressure region are formed on a radially inner circumferential face of the casing. A first outflow gradient is formed on an outer circumferential face of the casing and at the rear edge to separate the external flow at the rear edge. A second outflow gradient is formed on a throat-side adjacent face adjacent to the vortex generating portion and at a boundary between the throat-side adjacent face and the vortex generating portion to separate the internal flow. The first outflow gradient is equal to or larger than a gradient of a conical generatrix line connecting the front edge and the rear edge. The second outflow gradient is equal to or smaller than a reference gradient, the reference gradient being a gradient of a front end of the vortex generating portion when the reference cycloid curve forms the inner circumferential face. The negative pressure region of high vorticity is generated behind the vortex generating portion by virtue of the non-streamline shaped casing to increase the velocity of the internal flow.

According to the present invention, a method for increasing a velocity of an internal flow by utilizing an unsteady flow is provided. The method includes providing an impeller inside a casing having an annular shape and having an axial cross-section of a non-streamline shape, splitting a surrounding flow into an internal flow and an external flow at a front edge and to force the flows to cause separations, forming vortex streets downstream of the casing by the separations, and forming a negative pressure region having a cell structure in an annular direction by the vortex streets and vortex street fluctuations, thereby increasing the velocity of the internal flow inside the casing. The method is primarily characterized in that it further includes forming a reference line serving as a reference for forming the thickness of the casing as a cycloid curve connecting the front edge and a rear edge in the axial cross-section and having a convex portion at a throat section between the front and rear edges, forming the throat section and a vortex generating portion on a radially inner circumferential face of the casing, the vortex generating portion being downstream of the throat section to generate the negative pressure region, forming a first outflow gradient on an outer circumferential face of the casing and at the rear edge to separate the external flow at the rear edge, forming a second outflow gradient on a throat-side adjacent face adjacent to the vortex generating portion and at a boundary between the throat-side adjacent face and the vortex generating portion to separate the internal flow, setting the first outflow gradient to be equal to or larger than a gradient of a conical generatrix line connecting the front edge and the rear edge, setting the second outflow gradient to be equal to or smaller than a reference gradient, the reference gradient being a gradient of a front end of the vortex generating portion when the reference cycloid curve forms the inner circumferential face, and generating the negative pressure region having high vorticity behind the vortex generating portion by virtue of the non-streamline shaped casing to increase the velocity of the internal flow.

Advantages of the Invention

According to the fluid machine utilizing an unsteady flow of the present invention, a casing can be designed and produced easily, and by virtue of the shape of the casing, a strong and stable vortex street flow is formed in the flow, a strong negative pressure region is made in the vicinity of the casing on the outlet side thereof, and the velocity of an internal flow is increased, the size can be made larger with a short flow passage, and high output power generation can be performed.

According to the wind turbine of the present invention, a casing can be designed and produced easily, and by virtue of the shape of the casing, a strong and stable vortex street flow is formed in the flow, a strong negative pressure region is made in the vicinity of the casing on the outlet side thereof, the velocity of influent wind is increased, the size can be made larger with a short flow passage, and high output power generation can be performed.

According to the method for increasing the velocity of the internal flow of a fluid machine of the present invention, a casing can be designed and produced easily, and by virtue of the shape of the casing, a strong and stable vortex street flow is formed in the flow, a strong negative pressure region is made in the vicinity of the casing on the outlet side thereof, and the velocity of the internal flow is increased.

EMBODIMENTS OF THE INVENTION

Figure 1:
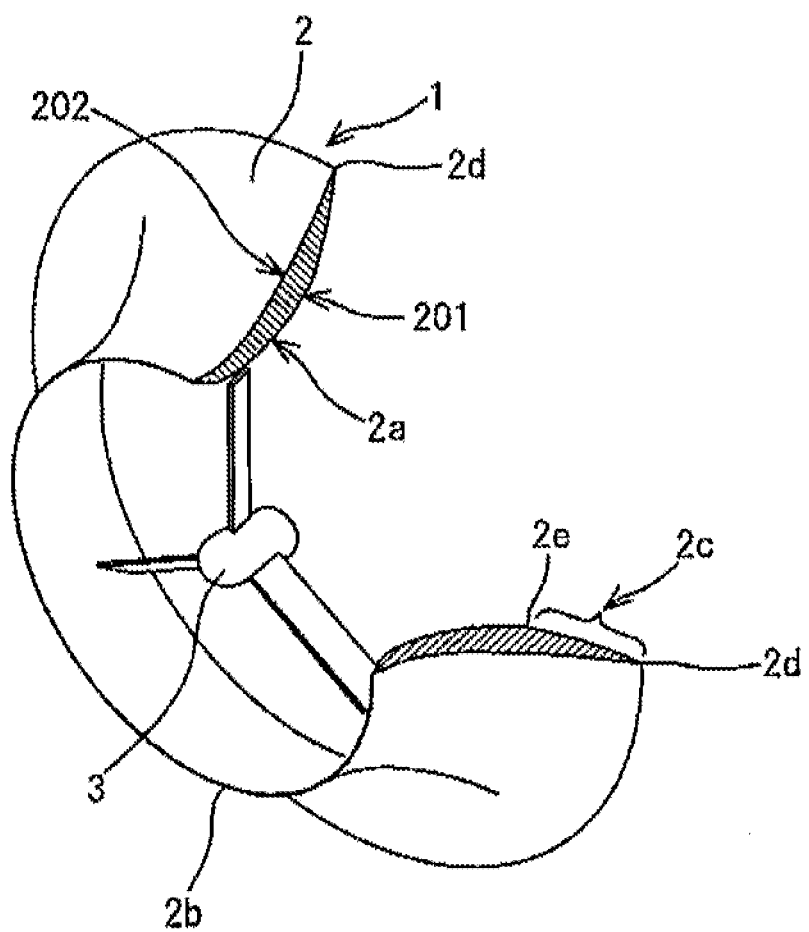
FIG. 1 is a partly broken-away perspective view of a fluid machine according to Embodiment 1 of the present invention.

A first aspect of the present invention is directed to a fluid machine utilizing an unsteady flow. The fluid machine includes a casing having an annular shape and an axial cross-section of a non-streamline shape, and an impeller disposed at a throat section inside the casing to rotate around an axis. The fluid machine is configured to split a surrounding flow into an internal flow and an external flow at a front edge and to force the flows to cause separations, such that vortex streets are formed downstream of the casing by the separations, and a negative pressure region having a cell structure in an annular direction is formed by the vortex streets and vortex street fluctuations, whereby a velocity of the internal flow inside the casing is increased. A reference line serving as a reference for forming the thickness of the casing connects the front edge and a rear edge in the axial cross-section, and includes a cycloid curve having a convex portion at the throat section between the front and rear edges. The throat section and a vortex generating portion disposed downstream of the throat section to generate the negative pressure region are formed on a radially inner circumferential face of the casing. A first outflow gradient is formed on an outer circumferential face of the casing and at the rear edge to separate the external flow at the rear edge. A second outflow gradient is formed on a throat-side adjacent face adjacent to the vortex generating portion and at a boundary between the throat-side adjacent face and the vortex generating portion to separate the internal flow. The first outflow gradient is equal to or larger than a gradient of a conical generatrix line connecting the front edge and the rear edge. The second outflow gradient is equal to or smaller than a reference gradient, the reference gradient being a gradient of a front end of the vortex generating portion when the reference cycloid curve forms the inner circumferential face. The negative pressure region of high vorticity is generated behind the vortex generating portion by virtue of the non-streamline shaped casing to increase the velocity of the internal flow. With this configuration, the casing can be designed and produced easily, strong and stable vortex streets can be formed in the flow by virtue of the shape of the casing, and the strong negative pressure region can be made in the vicinity of the casing on the outlet side thereof, whereby the velocity of the internal flow can be increased, the size can be made larger with a short diffuser length, and higher output can be obtained.

A second aspect of the present invention depends from the first aspect of the invention, and is directed to the fluid machine utilizing an unsteady flow. When the front edge and the rear edge have a thickness of a given width in a radial direction in the axial cross-section, an inner circumferential shape of the casing, including the vortex generating portion, is formed by the reference cycloid curve connecting the front edge and the rear edge on an inner circumferential side. With this configuration, when the front edge and the rear edge have a thickness of a given width in the radial direction, the inner circumferential shape of the casing is a cycloid. Thus, suitable vortex generating property is provided by virtue of the cycloid, and the casing can be designed and produced easily.

A third aspect of the present invention depends from the first aspect of the invention, and is directed to the fluid machine utilizing an unsteady flow. The casing is formed of a plate having a given thickness. The reference line includes the cycloid curve having the convex portion at the throat section between the front edge and the front end of the vortex generating portion, and a straight line or a second curve for forming the vortex generating portion between the front end of the vortex generating portion and the rear edge, to connect the front edge and the rear edge. The gradient of the conical generatrix line connecting the front edge and the rear edge is a positive gradient smaller than 40°. With this configuration, the vortex generating portion can be formed easily at a second portion using the straight line or the second curve instead of the cycloid shape, so that suitable vortex generating property can be provided easily, the casing can be designed and produced easily, and the fluid machine can be made lightweight.

A fourth aspect of the present invention depends from the first aspect of the invention, and is directed to the fluid machine utilizing an unsteady flow. The non-streamline shape is formed such that the thickness in the axial cross-section increases gradually and then decreases gradually or increases gradually and then decreases suddenly. A portion or all of an inner circumferential side of the non-streamline shape is the reference cycloid curve. With this configuration, when the thickness is increased gradually and decreased gradually or increased gradually and decreased suddenly, the shape of the portion or all of the inner circumferential shape of the casing has a thickness having the cycloid shape, whereby suitable vortex generating property can be provided by virtue of the cycloid and the casing can be designed and produced easily.

A fifth aspect of the present invention is depends from the second aspect of the invention, and is directed to the fluid machine utilizing an unsteady flow. When only the rear edge of the front and rear edges has a thickness of a given width in a radial direction in the axial cross-section, the vortex generating portion is a ring-shaped flat face having the given width. With this configuration, suitable vortex generating property can be provided by virtue of the cycloid; furthermore, since the vortex generating portion is a ring-shaped flat face, the negative pressure region is shifted toward the internal flow side, and a strong negative pressure region is made behind the vortex generating portion, whereby the velocity of the internal flow can be increased.

A sixth aspect of the present invention depends from the first aspect of the invention, and is directed to the fluid machine utilizing an unsteady flow. A plurality of phase control plates are provided on the vortex generating portion to adjust a phase of the vortex street fluctuations in the flow. With this configuration, suitable vortex generating property can be provided by virtue of the cycloid; furthermore, the fluctuating phase of the vortex formation is adjusted securely in the circumferential direction, and the cell structure of the flow can be clarified; moreover, a negative pressure region having strong negative pressure is accomplished in the vicinity of the casing on the outlet side thereof, and the velocity of the internal flow can be increased.

A seventh aspect of the present invention depends from any one of the first to sixth aspects of the invention, and is directed to the fluid machine utilizing an unsteady flow. A power generating apparatus is connected to the impeller to converting a rotation force of the impeller into an electric force. With this configuration, high output power generation can be carried out by virtue of the shape of the casing.

An eighth aspect of the present invention depends from any one of the first to seventh aspects of the invention, and is directed to the fluid machine utilizing an unsteady flow. A mesh made of a conductor is attached on the casing. With this configuration, the flow can be stabilized by virtue of the shape of the casing, and it can be expected that the fluid machine has an effect of shielding electromagnetic waves from a Doppler radar.

A ninth aspect of the present invention is directed to a wind turbine. The wind turbine includes a casing having an annular shape and an axial cross-section of a non-streamline shape, and an impeller disposed at a throat section inside the casing to rotate around an axis. The wind turbine is configured to split a surrounding flow into an internal flow and an external flow at a front edge and to force the flows to cause separations, such that vortex streets are formed downstream of the casing by the separations, and a negative pressure region having a cell structure in an annular direction is formed by the vortex streets and vortex street fluctuations, whereby a velocity of the internal flow inside the casing is increased. A reference line serving as a reference for forming the thickness of the casing connects the front edge and a rear edge in the axial cross-section, and includes a cycloid curve having a convex portion at the throat section between the front and rear edges. The throat section and a vortex generating portion disposed downstream of the throat section to generate the negative pressure region are formed on a radially inner circumferential face of the casing. A first outflow gradient is formed on an outer circumferential face of the casing and at the rear edge to separate the external flow at the rear edge. A second outflow gradient is formed on a throat-side adjacent face adjacent to the vortex generating portion and at a boundary between the throat-side adjacent face and the vortex generating portion to separate the internal flow. The first outflow gradient is equal to or larger than a gradient of a conical generatrix line connecting the front edge and the rear edge. The second outflow gradient is equal to or smaller than a reference gradient, the reference gradient being a gradient of a front end of the vortex generating portion when the reference cycloid curve forms the inner circumferential face. The negative pressure region of high vorticity is generated behind the vortex generating portion by virtue of the non-streamline shaped casing to increase the velocity of the internal flow. With this configuration, the casing can be designed and produced easily, strong and stable vortex streets can be formed in the flow by virtue of the shape of the casing, and the strong negative pressure region can be made in the vicinity of the casing on the outlet side thereof, whereby the velocity of the internal flow can be increased, the size can be made larger with a short diffuser length, and higher output can be obtained.

A tenth aspect of the present invention depends from the ninth aspect of the invention, and is directed to the wind turbine. When the front edge and the rear edge have a thickness of a given width in a radial direction in the axial cross-section, an inner circumferential shape of the casing, including the vortex generating portion, is formed by the reference cycloid curve connecting the front edge and the rear edge on an inner circumferential side. With this configuration, when the front edge and the rear edge have a thickness of a given width in the radial direction, the inner circumferential shape of the casing is a cycloid. Thus, suitable vortex generating property is provided by virtue of the cycloid, and the casing can be designed and produced easily.

An eleventh aspect of the present invention depends from the ninth aspect of the invention, and is directed to the wind turbine. The casing is formed of a plate having a given thickness. The reference line includes the cycloid curve having the convex portion at the throat section between the front edge and the front end of the vortex generating portion, and a straight line or a second curve for forming the vortex generating portion between the front end of the vortex generating portion and the rear edge, to connect the front edge and the rear edge. The gradient of the conical generatrix line connecting the front edge and the rear edge is a positive gradient smaller than 40°. With this configuration, the vortex generating portion can be formed easily at a second portion using the straight line or the second curve instead of the cycloid shape, so that suitable vortex generating property can be provided easily, the casing can be designed and produced easily, and the fluid machine can be made lightweight.

A twelfth aspect of the present invention depends from the ninth aspect of the invention, and is directed to the wind turbine. The non-streamline shape is formed such that the thickness in the axial cross-section increases gradually and then decreases gradually or increases gradually and then decreases suddenly. A portion or all of an inner circumferential side of the non-streamline shape is the reference cycloid curve. With this configuration, when the thickness is increased gradually and decreased gradually or increased gradually and decreased suddenly, the shape of the portion or all of the inner circumferential shape of the casing has a thickness having the cycloid shape, whereby suitable vortex generating property can be provided by virtue of the cycloid and the casing can be designed and produced easily.

A thirteenth aspect of the present invention depends from the tenth aspect of the invention, and is directed to the wind turbine. When only the rear edge of the front and rear edges has a thickness of a given width in a radial direction in the axial cross-section, the vortex generating portion is a ring-shaped flat face having the given width. With this configuration, suitable vortex generating property can be provided by virtue of the cycloid; furthermore, since the vortex generating portion is a ring-shaped flat face, the negative pressure region is shifted toward the internal flow side, and a strong negative pressure region is made behind the vortex generating portion, whereby the velocity of the internal flow can be increased.

A fourteenth aspect of the present invention depends from the ninth aspect of the invention, and is directed to the wind turbine. A plurality of phase control plates are provided on the vortex generating portion to adjust a phase of the vortex street fluctuations in the flow. With this configuration, suitable vortex generating property can be provided by virtue of the cycloid; furthermore, the fluctuating phase of the vortex formation is adjusted securely in the circumferential direction, and the cell structure of the flow can be clarified; moreover, a negative pressure region having strong negative pressure is accomplished in the vicinity of the casing on the outlet side thereof, and the velocity of the internal flow can be increased.

A fifteenth aspect of the present invention depends from any one of the ninth to fourteenth aspects of the invention, and is directed to the wind turbine. A power generating apparatus is connected to the impeller to converting a rotation force of the impeller into an electric force. With this configuration, high output power generation can be carried out by virtue of the shape of the casing.

A sixteenth aspect of the present invention depends from any one of the ninth to fifteenth aspects of the invention, and is directed to the wind turbine. A mesh made of a conductor is attached on the casing. With this configuration, the flow can be stabilized by virtue of the shape of the casing, and it can be expected that the fluid machine has an effect of shielding electromagnetic waves from a Doppler radar.

A seventeenth aspect of the present invention is directed to a method for increasing a velocity of an internal flow by utilizing an unsteady flow. The method includes providing an impeller inside a casing having an annular shape and having an axial cross-section of a non-streamline shape, splitting a surrounding flow into an internal flow and an external flow at a front edge and to force the flows to cause separations, forming vortex streets downstream of the casing by the separations, and forming a negative pressure region having a cell structure in an annular direction by the vortex streets and vortex street fluctuations, thereby increasing the velocity of the internal flow inside the casing. The method further includes forming a reference line serving as a reference for forming the thickness of the casing as a cycloid curve connecting the front edge and a rear edge in the axial cross-section and having a convex portion at a throat section between the front and rear edges, forming the throat section and a vortex generating portion on a radially inner circumferential face of the casing, the vortex generating portion being downstream of the throat section to generate the negative pressure region, forming a first outflow gradient on an outer circumferential face of the casing and at the rear edge to separate the external flow at the rear edge, forming a second outflow gradient on a throat-side adjacent face adjacent to the vortex generating portion and at a boundary between the throat-side adjacent face and the vortex generating portion to separate the internal flow, setting the first outflow gradient to be equal to or larger than a gradient of a conical generatrix line connecting the front edge and the rear edge, setting the second outflow gradient to be equal to or smaller than a reference gradient, the reference gradient being a gradient of a front end of the vortex generating portion when the reference cycloid curve forms the inner circumferential face, and generating the negative pressure region having high vorticity behind the vortex generating portion by virtue of the non-streamline shaped casing to increase the velocity of the internal flow. With this configuration, the casing can be designed and produced easily, strong and stable vortex streets can be formed in the flow by virtue of the shape of the casing, and the strong negative pressure region can be made in the vicinity of the casing on the outlet side thereof, whereby the velocity of the internal flow can be increased by the external flow.

Embodiment 1

Hereinafter, a fluid machine, more particularly a wind turbine, and a method for increasing the velocity of the internal flow of the fluid machine utilizing an unsteady flow, according to Embodiment 1 of the present invention will be described. However, it is basically applicable to other fluid machines, such a hydraulic turbine.

Figure 2:
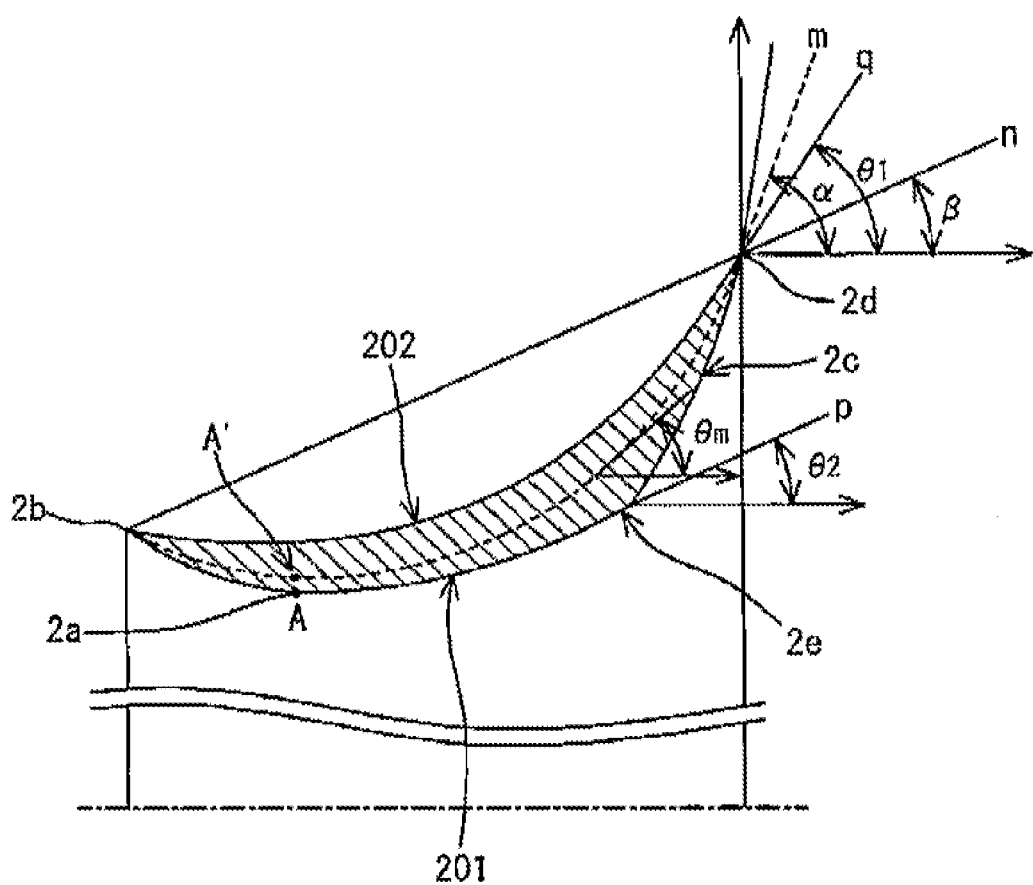
FIG. 2 is an axial sectional view of a cycloidal casing of the fluid machine according to Embodiment 1 of the present invention, which is based on a cycloid curve.

FIG. 1 is a partly broken-away perspective view showing a fluid machine according to Embodiment 1 of the present invention, FIG. 2 is an axial-direction sectional view showing a casing having a thickness and basically formed into a cycloid curve and provided between the front edge and the rear edge of the fluid machine according to Embodiment 1 of the present invention, and FIG. 3 is an explanatory view illustrating the flow around the fluid machine shown in FIG. 1.

Figure 30:
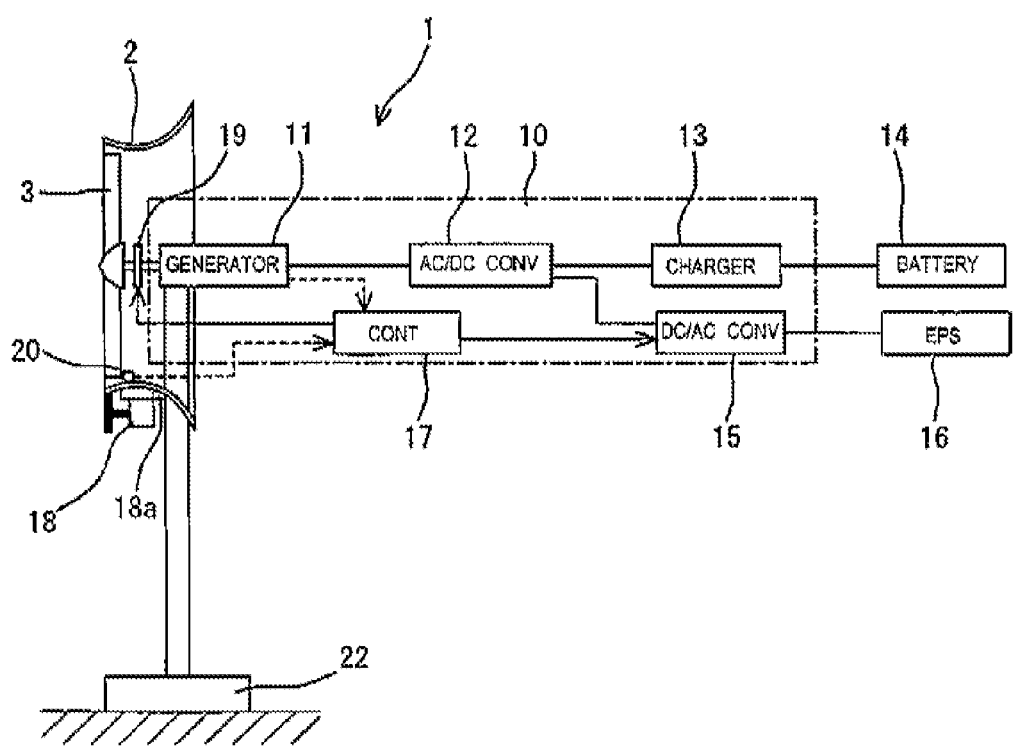
FIG. 30 is an block diagram inside the power generating apparatus of a wind turbine according to Embodiment 4 of the present invention.

As shown in FIGS. 1, 2 and 30, the fluid machine according to Embodiment 1 of the present invention is a wind turbine 1, and a power generator for power generation is connected thereto (refer to FIG. 30). When the impeller 3 of the wind turbine 1 rotates, the power generator is driven to convert kinetic energy into electrical energy. The details thereof will be described later. The wind turbine 1 is equipped with the impeller 3 that is rotated around its axis by wind and a diffuser-type casing 2 having an annular shape and having a non-streamline shape in the axial cross-section thereof, the whole shape thereof having a non-streamline shape and enclosing the impeller 3 so as to divide the wind into an internal flow and an external flow.

Inside the cross-section of the wind turbine 1 in the direction of the wind, the impeller 3 is disposed inside the casing 2 with a small gap provided between the rotation face of the distal end thereof and the casing 2, and the wind turbine 1 has an annular shape in the axial direction thereof. The casing 2 according to Embodiment 1 is a diffuser-type (having an expanding shape); the diffuser type is adopted because the velocity of the flow at the distal end portion of the impeller 3 becomes maximum at a throat section 2a (a portion having the minimum cross-sectional area in the casing 2) and because the diffuser type is more compact than a nozzle type (having a contracting shape) in structure. The flow passage from the front edge 2b to the throat section 2a serves as an inflow section, the cross-sectional area of the flow passage is reduced gradually and the velocity of the flow is increased. The flow passage from the throat section 2a to the rear edge 2d is increased, and the velocity is decreased.

However, in the conventional wind turbine 1, the throat section 2a thereof is disposed so as to be relatively fairly close to the front edge 2b, and the impeller 3 is placed at this position, whereby a shape is formed in which the diffuser portion thereof on the downstream side is emphasized. Hence, the diffuser has a fairly long shape in its longitudinal direction. With this configuration, the wind turbine 1 cannot be made compact.

On the other hand, the casing 2 according to Embodiment 1 has a non-streamline shape, the flow therearound is divided into the internal flow and the external flow by the casing 2, thereby being separated forcibly; as a result, vortex streets are formed therebehind; these vortex streets and vortex street fluctuations form a strong negative pressure region having a cell structure in an annular direction behind the casing 2, and the action of this negative pressure region increases the velocity of the internal flow inside the casing 2. Challenges are done to obtain the best shape of the casing 2 so that the strength of the vortices of the vortex streets is intensified and the negative pressure of the negative pressure region is further augmented.

Figure 3A:
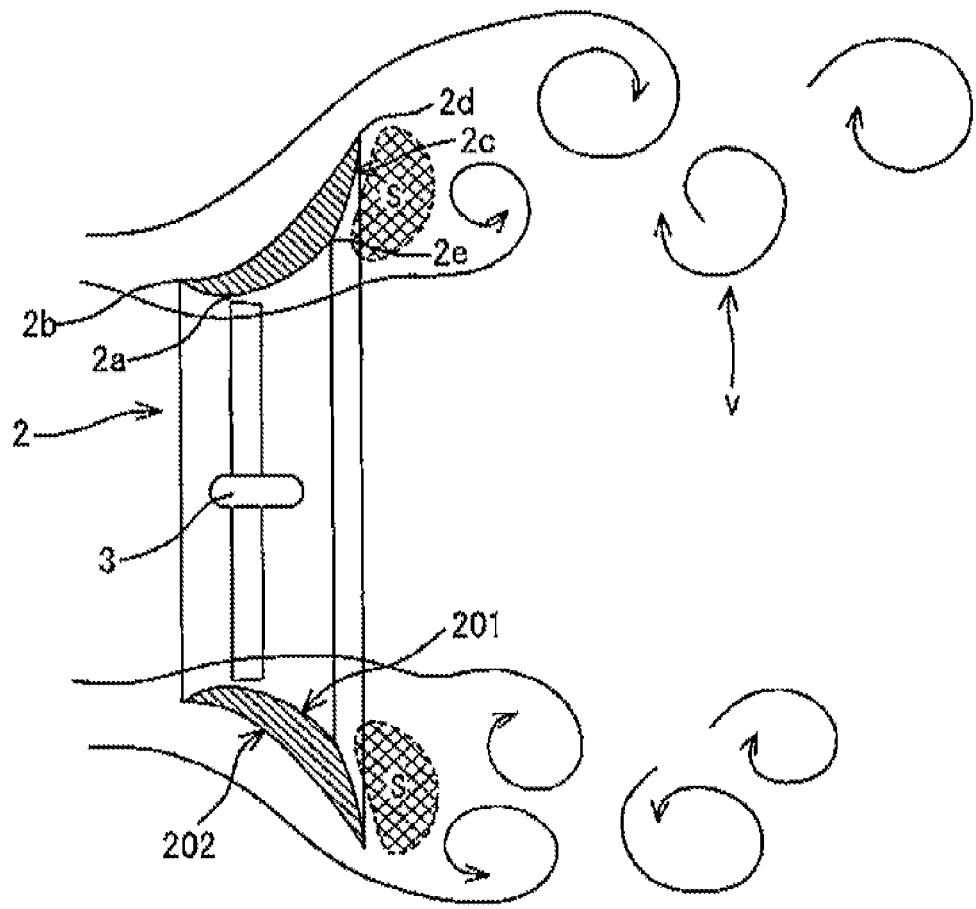
FIG. 3(a) is an explanatory diagram illustrating the flow around the fluid machine of FIG. 1.

As shown in FIGS. 1, 2 and 3, in the axial cross-section of the casing 2, a vortex generating face 2c (the vortex generating portion in Embodiment 1 of the present invention) for separating the internal flow from the surface is provided on the inner circumferential face 201 of the casing 2 on the downstream side from the throat section 2a. In the internal flow entered from the opening at the inlet of the casing 2, a boundary layer is developed in the vicinity of the throat section 2a, and the internal flew is separated at the front end 2e of the vortex generating portion on the inner circumferential face 201. Together with the external flow separated at the rear edge 2d of the outer circumferential face 202, the separated internal flow generates rolling behind the casing 2, thereby forming Karman vortex streets v (refer to FIG. 3(a)) on the downstream side. These vortex streets v and the vortex street fluctuations thereof form a negative pressure region S (refer to FIG. 3(a)) having high vorticity and arranged in an annular direction behind the vortex generating face 2c and close to the impeller 3, thereby increasing the velocity of the internal flow inside the casing 2.

The negative pressure region S having the cell structure formed by the vortex streets and the vortex street fluctuations thereof will be described below. The vortex streets are generated unsteadily (alternately) on the downstream side of the casing 2 as shown in FIG. 3(a). More specifically, in the case that it is assumed that the casing has such a shape as that shown in FIG. 3(b), when the radial height h of the vortex generating face 2c is sufficiently smaller than the inside diameter d of the throat section 2a of the casing 2 (h/d<<1), the cells of the negative pressure region S having a plurality of vortex street fluctuation scale sizes are formed in an annular shape behind the vortex generating face 2c by the vortex streets formed at a certain timing. When the vorticity in the region is intensified, the negative pressure lowers further. The tube length (the axial length of the casing) obtained at this time is Lt.

The internal flow and the external flow of the casing 2 are respectively separated at the separation points on the internal circumferential face and the external circumferential face of the casing 2, and a Karman vortex is formed at each circumferential cross-section on the downstream side. Furthermore, in the cross-section thereof and in the vortex formation in the cross-section, strong vortex formation, weak vortex formation and fluctuations (unevenness) are present in the circumferential direction. The circumferential range in which the strong vortex formation and weak vortex formation are generated is slightly smaller than the vortex street fluctuation scale ($3d_c$ to $4d_c$, $d_c$: cylinder diameter) in the axial direction of a two-dimensional cylinder; when it is assumed that the projected width of each cross-section having a doughnut shape as viewed from the main flow of the casing 2 is D (including the height h of the vortex generating face) (refer to FIG. 3(b)), the vortex street fluctuation scale in the circumferential direction becomes 2D to 3D. This corresponds to the fact that the two-dimensional cylinder is closed in an annular shape and has a three-dimensional shape, and this is backed up quantitatively.

When it is assumed that the number of the cells is N and the inside diameter of the casing 2 is d, $\{\pi\cdot(d+D)\cdot D/D\cdot N\}=\pi\cdot(d+D)/N$ corresponding to the aspect ratio (vertical to horizontal ratio) in the case of two-dimensional representation becomes a vortex street fluctuation scale. The above-mentioned scale 2D to 3D corresponds to d/h=approximately 6 to 12 in the case that N is 12. Hence, in an ordinary fluid machine, there is a possibility that two cases are present: in the case of a vortex street in which each region is stabilized at random (H/d<<1) and in the case of a vortex street in which a pair of cells is stabilized simultaneously (h and d have the same order of magnitude).

The negative pressure region S having a high vorticity is formed at the cells in the negative pressure region in which strong vortex formation has occurred. In the flow, some cells become independent and strong or weak due to the fluctuations. The cells are replaced mutually. By virtue of the formation of the negative pressure region S having high vorticity, the pressure around the region is lowered, and the velocity of the internal flow is improved by the difference in pressure. As a result, the impeller 3 can rotate at high speed, and the wind turbine 1 can output a high torque driving force and can perform high output power generation. The ordinary wind turbine 1 frequently satisfies the condition that the radial height h of the vortex generating face 2c is sufficiently smaller than the inside diameter d of the throat section 2a of the casing 2 (h/d<<1).

When the radial height of the vortex generator 2c is not different in order of magnitude from the inside diameter of the throat section 2a of the casing 2 (when h and d have the same order of magnitude, h/d≈1), the mutual relevance among cells constituting one cross-section of the casing 2 is intensified in the respective cells, and a negative pressure region S having high vorticity is formed at a pair of diagonally opposite cells. Also in this case, the pressure in the vicinity of the outlet of the casing 2 is low and stable, whereby the velocity of the internal flow can be improved by the pressure difference.

However, the flow including the negative pressure region S having high vorticity cannot be produced easily. The reason for this is that if the casing 2 is simply formed into a non-streamline shape, pressure loss occurs unnecessarily, the vorticity of the vortex streets is not intensified, and the negative pressure region S having a strong negative pressure is not generated distinctly. An ideal casing is required to have a shape capable of producing vortex flows of strong vortices and the negative pressure region S having a strong negative pressure without causing useless loss in the flow.

If the wind turbine 1 is not equipped with the impeller 3 acting as a resistive element, analysis can be made on the assumption that the flow is a potential flow having no separation; in this case, the flow along the internal circumferential face 201 of the casing 2 has the maximum velocity in the vicinity of the throat section 2a.

However, in the wind turbine 1 according to Embodiment 1, the rotating impeller 3, acting as a resistive element, is present at the throat section 2a of the casing 2. For this reason, it is necessary to find an optimal shape that allows the velocity to be increased most at the throat section 2a against the resistance. This kind of severe restriction is added to the above-mentioned ideal casing. The casing according to the present invention has a structure for causing separation effective only for vortex street formation to be done without causing useless pressure loss when the impeller 3 acting as a resistive element is present, thereby having a shape for forming the negative pressure region S having a low pressure for increasing the internal flow in the vicinity of the throat section.

The inventors of the present invention previously tried to form various shapes, for example, tried to form the vortex generating face 2c into a flange shape. However, they felt that these shapes had room for improvement. After through trial and error and after through comparison and examination, they have obtained a finding that cycloid known as brachistochrone has the shape sufficiently satisfying the conditions of the ideal casing. A casing based on a cycloid curve (hereafter also referred to as a cycloid-shaped casing or a cycloid casing) is hereafter described generally, and the vortex formation characteristics of a casing, the internal circumferential face of which is formed by the cycloid itself, will be detailed in Embodiments 2 and 3 described later. In the case that the thickness of the casing is negligible, the casing based on the cycloid curve is defined as a rotator casing in which the curve is used as a generatrix line, and in the case that the casing has a thickness, the casing based on the cycloid curve is defined as a rotator casing in which a thickness is provided for a reference line (corresponding to the generatrix line in the case that the thickness is negligible).

Figure 4:
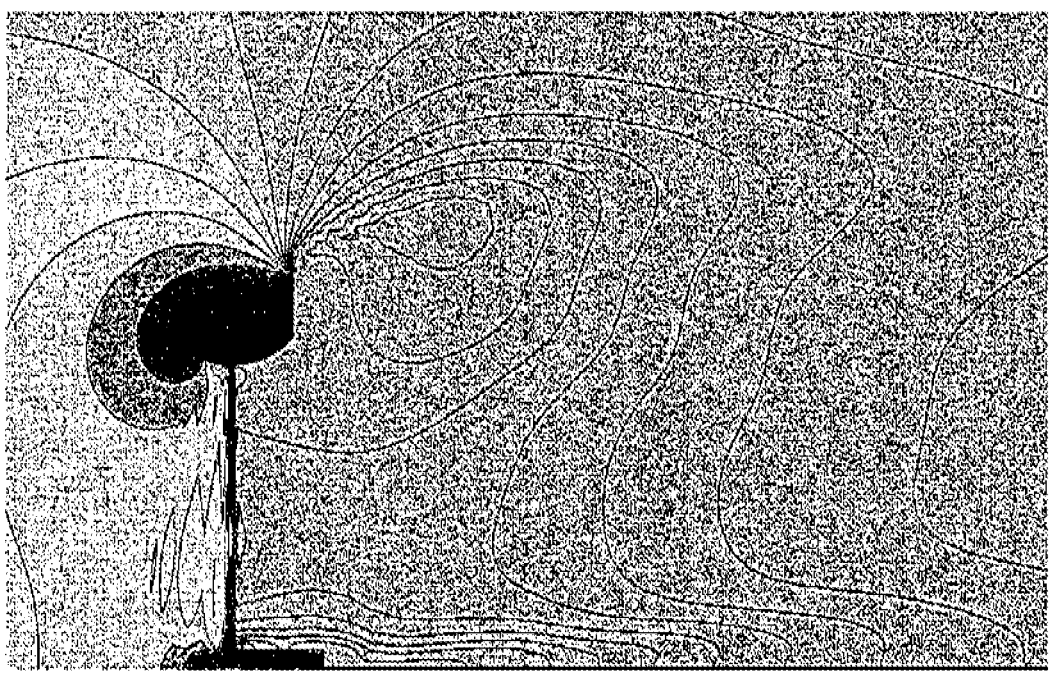
FIG. 4 is a chart of pressure distribution averaged with respect to time and averaged with respect to circumferential direction around the fluid machine equipped with a flanged casing having a flange height of 10% and a tube length 13.7% (% represents the ratio to the inside diameter of the throat section)
Figure 5:
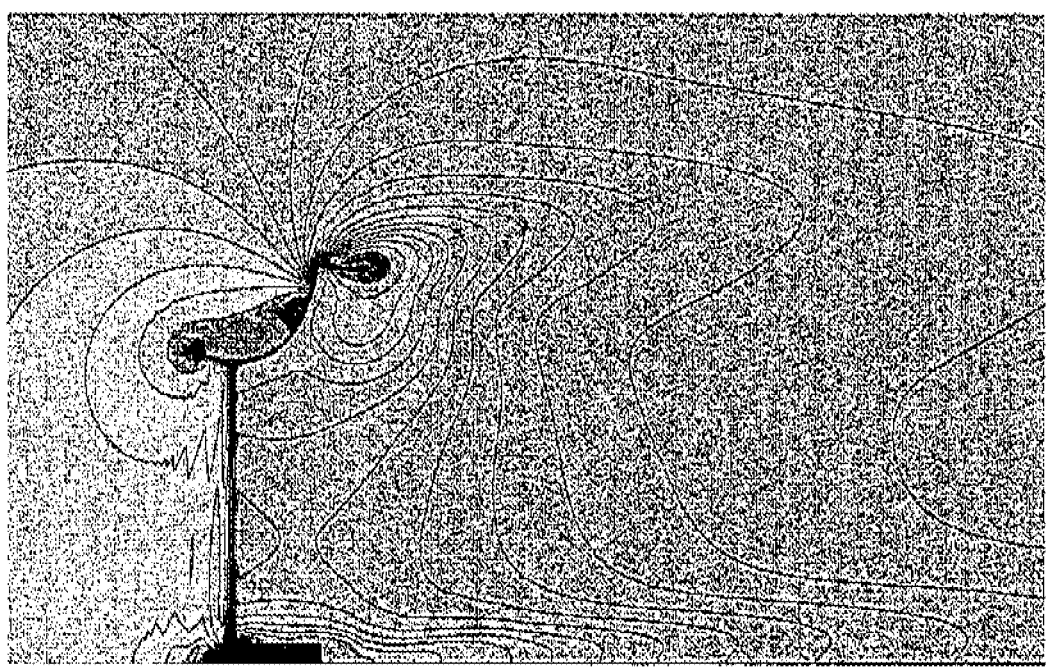
FIG. 5 is a chart of pressure distribution averaged with respect to time and averaged with respect to circumferential direction around the fluid machine having the cycloidal casing.
Figure 8:
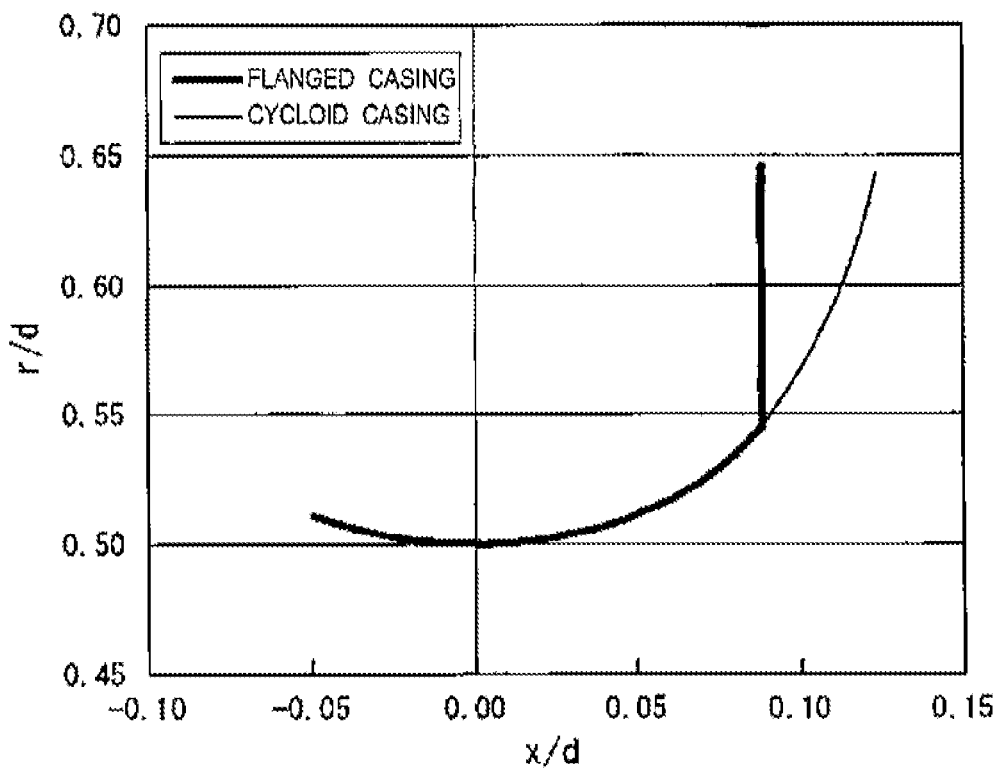
FIG. 8 is an explanatory diagram comparing the profile of the cycloidal casing of Embodiment 1 of the present invention and the profile of the flanged casing having a flange height of 10% and a tube length of 13.7%.

FIG. 4 shows pressure distribution averaged with respect to time and averaged with respect to circumferential direction around the wind turbine 1 equipped with a flanged casing having a flange (a vortex generating face) having a tube length (the axial length of the casing) of 13.7% d and a height h of 10% d in the case that the diameter of the throat section is d (Lt/d=0.137, h/d=0.1, hereafter referred to as a flanged casing having a flange height of 10% and a tube length of 13.7%), and FIG. 5 shows pressure distribution averaged with respect to time and averaged with respect to circumferential direction around the wind turbine 1 equipped with the cycloid casing. Numerical calculations were performed using the RIAM-COMPACT numerical simulator developed by Kyushu University Research Institute for Applied Mechanics, also using high Reynolds number analysis software adopting the LARGE-EDDY-SIMULATION method (commonly known as the LES method) serving as the most advanced turbulence model, and further using the DIRECT NUMERICAL SIMULATION method (commonly known as the DNS method) that does not use any turbulence models. The results of the calculations shown in the figures are based on the DNS method. The LES method was used for reference. The details of the shapes of the flanged casing and the cycloid casing are shown in FIG. 8. FIG. 8 shows the comparison between the shape of the flanged casing having a flange height of 10% and a tube length of 13.7% and the shape of the cycloid casing for use in numerical calculations.

In FIG. 8, both the casings have a front edge at a position of x/d=−0.005 and a throat section formed at a position of x/d=0.00 and also have an identical shape up to the vicinity of a position of x/d=0.09 on the downstream side. However, in the case of the flanged casing, a flange having a height of h=10% d (corresponding to 0.10 in the width of r/d) is formed so as to be perpendicular to the axis in the vicinity of x/d=0.09. On the other hand, in the case of the cycloid casing, the cycloid form is extended from this position until its height becomes as high as the height h of the flange. Herein, d is the diameter of the throat section, and h is the radial height h of the vortex generating face 2c. In the case of the flanged casing, Lt=0.137d, and h=0.0137d. Furthermore, in the case of the cycloid casing, Lt=0.17d, slightly longer. As described above, the flanged casing is provided with the flange at its rear end to increase the outside diameter of the outlet of the diffuser, however, in the case of the cycloid casing, its shape is formed by extending the cycloid shape to the outside diameter of the flange of the flanged casing, whereby the casing itself is used so as to be integrated with the flange.

According to FIG. 4, it is found that a high pressure region is formed on the front face side of the flange and that a negative pressure region, not so low, is formed on the downstream side of the distal end of the flange. On the other hand, according to FIG. 5, the pressure distribution of the cycloid casing 2 has no useless high pressure portion, the flow is very smooth and unique, and a negative pressure region cutting into the side of the throat section is formed from the vicinity of the rear edge on the rear face of the casing 2. More specifically, since the casing is formed of the cycloid curve, the flow is throttled at the throat section and then expands on the downstream side; however, fluid particles flow during this period along the face formed of the brachistochrone by taking, so to speak, the minimum time passage; hence, the average amounts of the fluctuations and variations are small during the period, and the flow becomes very smooth and stable and then is separated; once the flow reaches the separation point, the flow can pull in a stable secondary flow having high circularity from the downstream side, whereby a strong negative pressure region is formed. Hence, although the flanged casing having a flange height of 10% and a tube length of 13.7% has large pressure loss and the action of the negative pressure region is small, in the case of the cycloid casing, its fluid resistance is small and the negative pressure region is strongly negatively pressurized; it is thus found that the action to the internal flow is strong.

Figure 6:
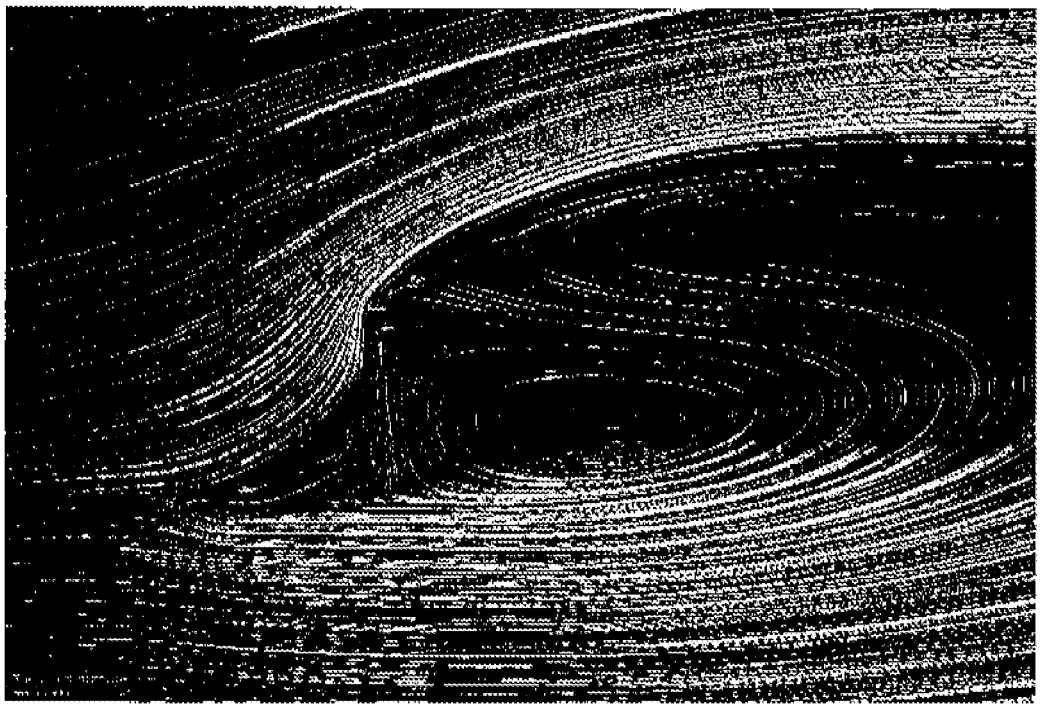
FIG. 6 is a chart of flow lines averaged with respect to time and averaged with respect to circumferential direction around the fluid machine having the flanged casing of FIG. 4.
Figure 7:
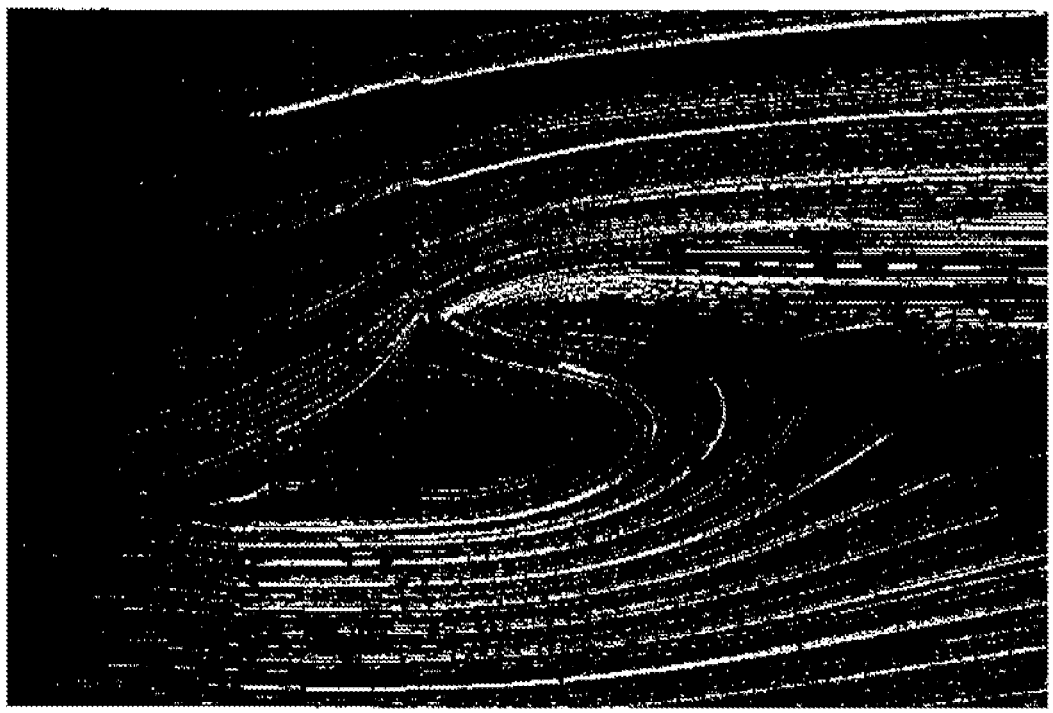
FIG. 7 is a chart of flow lines averaged with respect to time and averaged with respect to circumferential direction around the fluid machine having the cycloidal casing of FIG. 5.

FIG. 6 is an explanatory view showing flow lines averaged with respect to time and averaged with respect to circumferential direction around the wind turbine 1 equipped with the flanged casing shown in FIG. 4, and FIG. 7 is an explanatory view showing flow lines averaged with respect to time and averaged with respect to circumferential direction around the wind turbine 1 equipped with the cycloid casing shown in FIG. 5. According to the figures, it is found that the main flow of the flow around the flanged casing is disturbed by the presence of the casing and is expanded rearward and separated into flows having unstable regions. The flow is blocked at this position due to the presence of the flange. On the other hand, the main flow of the flow of the cycloid casing is not disturbed by the casing, and vortices having a strong negative pressure region are formed behind the casing. Furthermore, in the case of the cycloid casing, it is found that the flow jumps from the upper face of the rear edge of the casing 2 smoothly and quickly. This is because blocking as caused by the casing having the flange does not occur.

Accordingly, when the shape is formed of the cycloid curve, the vortex generating face 2c of the casing 2 does not have an excessively steep shape but has an appropriate non-streamline shape not disturbing the flow more than necessary, and the jumping out angle of the flow from the rear edge is directed in a more inward direction. Furthermore, the internal flow merges with the external flow smoothly in a time-averaged manner in the range of approximately one to two times the axial length of the casing behind the vortex generating face 2c. Hence, vortices having the strong negative pressure region are formed in the immediate vicinity of the vortex generating face 2c, and this action increases the velocity of the flow at the throat section 2a, whereby the output of the wind turbine is increased.

Figure 9:
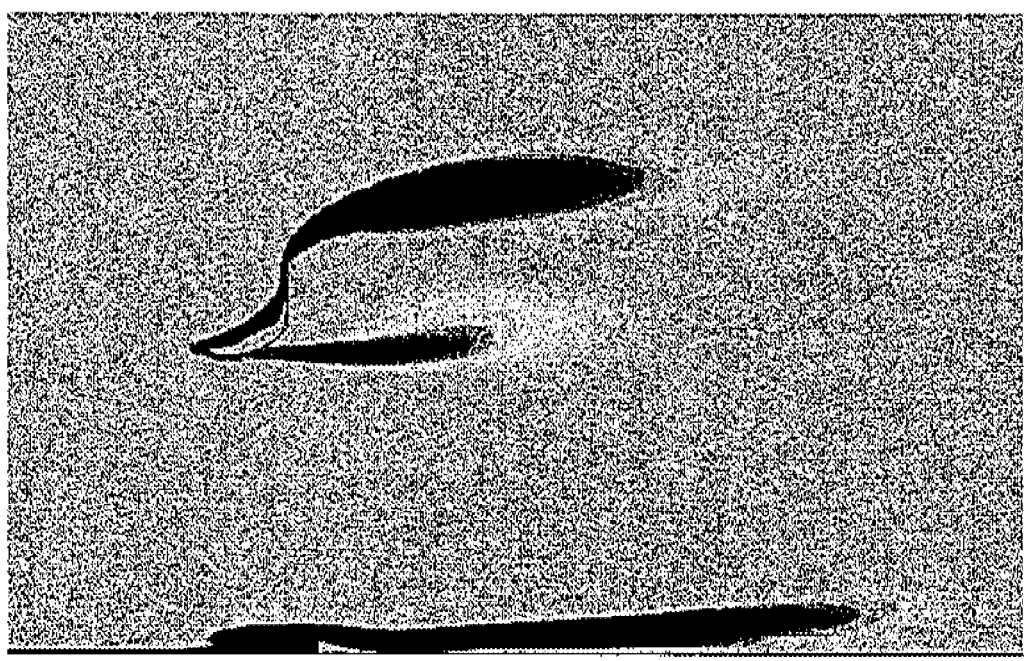
FIG. 9 is a chart of voracity distribution, obtained by numerical calculations, averaged with respect to time and averaged with respect to circumferential direction in the flow field around the flanged casing having a flange height of 10% and a tube length of 13.7%.
Figure 10:
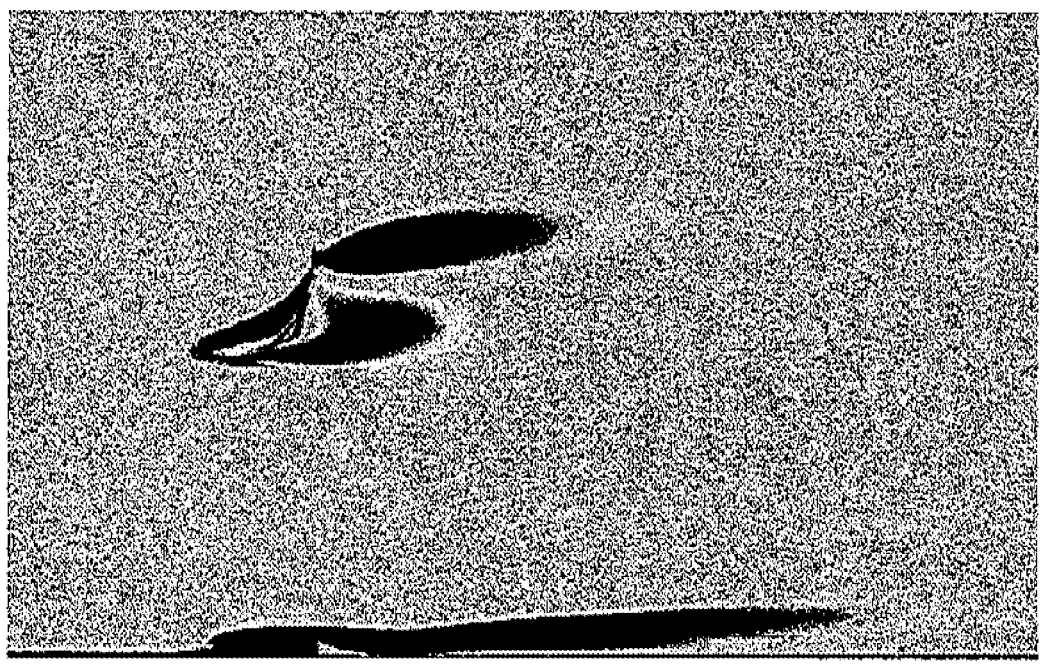
FIG. 10 is a chart of vortcity distribution, obtained by numerical calculations, averaged with respect to time and averaged with respect to circumferential direction in the flow field around the cycloidal casing of Embodiment 1 of the present invention.

Moreover, FIG. 9 shows the numerical calculations of vorticity distribution averaged with respect to time and averaged with respect to circumferential direction in the flow field around the flanged casing having a flange height of 10% and a tube length of 13.7%. In the case of the flanged casing having a flange height of 10% and a tube length of 13.7%, it is found that a portion having high vorticity is formed so as to have a region being thin on the downstream side in the vicinity of the distal end of the impeller and extending long. On the other hand, FIG. 10 shows the numerical calculations of vorticity distribution averaged with respect to time and averaged with respect to circumferential direction in the flow field around the cycloid casing. According to FIG. 10, in the case of the cycloid casing, a region having very high vorticity is formed close to the rear of the vortex generating face and in the vicinity of the outlet of the wind turbine. In the case that the vorticity is high, the negative pressure is increased, and the velocity of the flow therearound is increased.

In comparison with casings of other shapes, the cycloid casing has very distinctively excellent characteristics in making the pressure of the negative pressure region low and distinctive and in making the flow stable and smooth as understood referring to FIGS. 5, 7 and 9. A vortex street flow in which the negative pressure region having high vorticity is formed on the downstream side in the range of one to two times the axial length of the casing is a peculiar feature that cannot be attained by the casings of other shapes. These results indicate that the cycloid casing has a possibility of significantly contributing to an unsteady flow. Hence, it can be said that the cycloid shape is a shape being ideal, optimal or close to it for a fluid machine utilizing an unsteady flow.

Accordingly, it is found that, when determining the shape of the casing 2 of the wind turbine 1, the shape of the casing can be configured on the basis of the cycloid curve. More specifically, in the case that its thickness is negligible, a cycloid casing in which the above-mentioned cycloid curve is directly used as a generatrix line can be used (for details, refer to Embodiment 2), and in the case of a casing having a small but non-negligible thickness, the framework of the casing can be determined on the basis of the above-mentioned cycloid curve used as a reference and thickness can be added to provide a shape close to the cycloid casing.

The cycloid curve used as the reference must be a cycloid curve along which a connection is made between the front edge 2b and the rear edge 2d in the axial cross-section and which has a convex portion formed so as to correspond to the throat section 2a formed between the front and rear edges. This is because the shape of the cycloid curve is determined by both ends and by the position of the maximum value or the minimum value in the range between them. Even in the case that the cycloid casing is expanded, the cycloid casing has vortex street formation characteristics equivalent to those of the cycloid shape, provided that the cycloid casing is used as the reference.

A method for determining the shape of a casing having a non-streamline shape based on this cycloid curve will be described below. FIG. 2 is an axial sectional view of a casing having a thickness, based on the cycloid curve and provided between the front edge and the rear edge thereof. In FIG. 2, the casing 2 has a crescent shape, the thickness in the axial cross-section of which is increased and decreased gradually, and is a rotator expanding from the front edge 2b to the rear edge 2d at a certain gradient. The gradient n of the conical generatrix line connecting between the front edge 2b and the rear edge 2d in FIG. 2 is an expansion angle β. More specifically, the casing is a conical and annular rotor. The reference line (the generatrix line in the case that the thickness is negligible) serving as the reference when the framework of the casing 2 is determined is a cycloid curve m along which a connection is made between the front edge 2b and the rear edge 2d. Since the throat section 2a is formed in the case of the wind turbine 1 according to Embodiment 1, the cycloid curve m has a convex portion A' (the minimum value in the cross-section in FIG. 2) shown in FIG. 2. The axial position of the convex portion A' is the same as the axial position of the convex portion A in which the inner circumferential face 201 has the minimum cross-sectional area. At the convex portion A and the convex portion A', the minimum value or the maximum value is obtained depending on the cross-sectional direction of the rotator.

In the axial cross-section in FIG. 2, the shape of the inner circumferential face 201 of the casing 2 is expanded so that its thickness is increased and decreased gradually along the cycloid curve m; with respect to its radius, the radius is decreased gradually in the range from the front edge 2b to the throat section 2a and increased in the range from the throat section 2a to the rear edge 2d so that a curved shape is formed. The range of a predetermined length from the rear edge 2d of the inner circumferential face 201 serves as a line that is used as the generatrix line for forming the vortex generating face 2c. A cycloid shape, the thickness of which is negligible, is most optimal, and a thin shape is preferable in which the inner circumferential face 201 is made as close to the cycloid curve m as possible. The end point of the vortex generating face 2c on the inside diameter side becomes the front end 2e of the vortex generating portion. An outflow gradient for separating the internal flow is formed on a face adjacent to the vortex generating face 2c of the inner circumferential face 201 and at the boundary position (the front end 2e of the vortex generating portion, a position on the inner circumferential face 201) on the side of the front edge thereof. The boundary layer of the internal flow develops gradually from around the throat section 2a, and the flow is separated at the front end 2e of the vortex generating portion due to the presence of the vortex generating face 2c, The inner circumferential face 201 has a shape in which the gradient is usually changed discontinuously at the front end 2e of the vortex generating portion. However, in the case that the inner circumferential face 201 has the cycloid shape in which the cycloid curve is used as the generatrix line, the vortex generating face 2c is formed by only directly by using pan of the shape on the downstream side as the vortex generating face 2c (more specifically, by directly using part of the cycloid curve after the separation point as the vortex generating face 2c as in the case of the shape ahead of the separation point. The separated internal flow rolls in together with the external flow also separated behind the casing 2 as shown in FIG. 3(a), and vortex streets are formed on the downstream side, whereby a negative pressure region having high, voracity is formed immediately behind the vortex generating face 2c.

In the axial cross-section shown in FIG. 2, an outflow gradient θ2 for separating the internal flow is provided on the inner circumferential face (an adjacent face according to Embodiment 1 of the present invention) on the upstream side in the immediate vicinity of the front end 2e of the vortex generating portion. More specifically, an inclined face in the direction of a tangent line p is formed on the upstream side in the immediate vicinity of the front end 2e of the vortex generating portion to promote flow separation. This outflow gradient θ2 is set so as to be equal to or less than the gradient of the front end 2e of the vortex generating portion at which the separation occurs when the inner circumferential face 201 is formed of the cycloid curve m. The gradient in the case of the cycloid curve m is used as the reference; when the thickness is added, the gradient is less than this reference value θm. More specifically, in the case that the thickness is added to the casing, the result in the case of the cycloid curve m is used, and the thickness is added accordingly. Hence, the relationship among the position of the separation point (the front end 2e of the vortex generating portion, that is, the annular separation line of the rotator) in the case of the cycloid shape, its gradient and its velocity U is obtained in advance, and the outflow gradient θ2 at the design velocity U is set on the basis of this. The curvature radius on the expanded inner circumferential side becomes larger than that of the cycloid curve m, and the separation point (the front end 2e of the vortex generating portion) moves to the rear edge side, whereby the outflow gradient θ2 becomes less than the reference value θm (θ2<θm). It is preferable that the accurate relationship among the inner circumferential face, the position of the front end 2e of the vortex generating portion and the gradient θ2 be obtained on the basis of experiments; however, in the case that the relationship is obtained, for example, by numerical calculations, a point in the boundary layer of the inner circumferential face at which the wall surface shearing force of the flow becomes 0 is obtained for example and used as the separation point. For example, when a coordinate system, in which the direction of the wall surface is x and the normal direction thereof is y, is assumed in the flow, and when the velocity of the flow is assumed to be u, the shearing stress is μdu/dy (μ is the viscosity coefficient of the fluid); hence, a point du/dy=0 (at y=0) at which the velocity gradient in the normal direction becomes 0 is obtained and is used as the separation point. This point can be calculated easily by numerical calculations. The front end 2e of the vortex generating portion approaches the throat section side as the outflow gradient θ2 is made smaller, and approaches the rear edge side as the gradient is made larger.

The position of the separation point (the front end 2e of the vortex generating portion) is affected by the wind velocity U. In the actual flow, the slight difference in the outflow gradient θ2 is absorbed in the variations in the wind velocity of natural wind. The outflow gradient θ2 is a gradient at which the flow can be separated at the front end 2e of the vortex generating portion, when the output of the wind turbine 1 for power generation, for example, is carried out. In the case that the gradient is set so as to be equal to or less than the reference gradient that is based on the gradient of the cycloid shape, the flow is separated at the intended front end 2e of the vortex generating portion or in the vicinity thereof, and vortex streets having strong vortices can be generated.

Furthermore, on the basis of the gradient α of the rear edge 2d of the cycloid curve m, by the setting of the outflow gradient θ2 to a predetermined gradient (θ2<α<90°) less than a determined by the cycloid (for example, the setting performed so as to be associated with a linear function or a power function of α), the gradient is associated with α, the gradient can be set easily to the gradient according to which the internal flow is separated from the inner circumferential face 201. In the case of a shape being bent almost vertically, a value close to the gradient α of a gradually increasing cut end type (a banana-shaped cross-section) according to Embodiment 3 described later can be adopted (see FIG. 7).

Figure 3B:
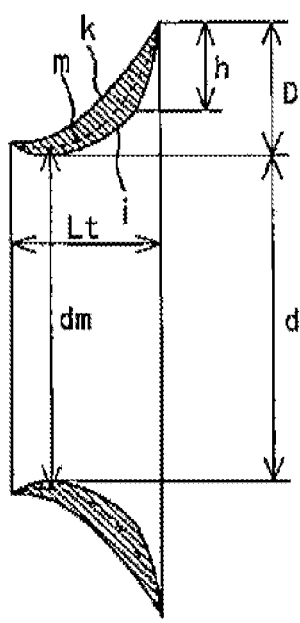
FIG. 3(b) is an explanatory diagram illustrating a size of the casing of FIG. 2.

The thickness of a thin casing shape obtained by adding a thickness to the cycloid curve m as the reference line will be described herein. The thin casing is, as a whole, a rotator having a shape expanding in one direction into the shape of a trumpet. In one cross-section of the rotator casing in which the cycloid curve m is used as the reference line, as shown in FIG. 3(b), it is assumed that the line indicating the internal surface of the thin casing is formed of an internal curve i, that the line indicating the external surface thereof is formed of an external curve k, and that the inner thickness of the throat section between the cycloid curve m and the internal curve i is $\Delta_i$. Furthermore, it is assumed that the outer thickness of the throat section between the cycloid curve m and the external curve k is $\Delta_k$. Hence, the diameter of the throat section of the internal curve i of the thin casing, that is, the inner circumferential diameter of the casing 2, is $d=d_m-2\Delta_i$. Herein, dm is the diameter of the cycloid curve m at the throat section.

The internal curve i of the thin shape in the axial cross-section satisfies the following conditions (1) and (2). More specifically, (1) the internal curve i intersects the cycloid curve m at the front edge 2b. (2) The internal curve i also has a local minimal value or a local maximal value at the throat section, the position of which is the same as that of the throat section of the cycloid curve m in the axial direction. Furthermore, (3) the internal curve i intersects the cycloid curve m at the rear edge 2d; this condition is added to facilitate design. On the internal curve i, the vortex generating face 2c is formed by connecting the front end 2e of the vortex generating portion on the curve to the rear edge 2d using a straight line or a curve having a small curvature.

The internal curve i can be represented by, for example, a quadratic function, a tertiary or higher order power function or a trigonometric function having a local maximal value and a local minimal value in the region between the front edge 2b and the rear edge 2d and satisfying the conditions (1) and (2), and also represented by a convex function or a concave function satisfying the condition (3) in some cases. A shape having a thickness $\Delta$ is obtained as a whole at the throat section by the inner thickness $\Delta_i$ and the outer thickness $\Delta_k$. in addition, the inner thickness $\Delta_i$ at the throat section is the largest thickness inside the thin casing. The convex function or the concave function is a function that increases or decreases monotonously and smoothly up to the throat section and then reversely decreases or increases monotonously and smoothly from the throat section.

A flow forming condition in which the flow inside the cycloid casing, the thickness of which is negligible, can be regarded to be fluid-dynamically almost identical with the flow inside the thin casing in which the cycloid curve m is used as the reference line will be examined as described below.

In the cycloid casing, the thickness of which is negligible, and the thin casing, the same cycloid curve m is commonly used for the frameworks of their shapes. Under the consideration that the thickness of the thin casing is small, the passages thereof become almost the same, and the flows thereof become almost the same excluding microscopic flows. If the flows in the two passages have the same Reynolds number $Re=LU/\nu$, it is assumed that the flows are represented by almost identical flow patterns. Herein, L is a typical dimension, U is a typical velocity, and $\nu$ is a kinematic viscosity coefficient.

The passage area A of the internal passage configured as a rotator having the cycloid curve m is $\pi d_m^2/4$, and the passage area $A_i$ configured as a rotator having the internal curve i is $\pi d^2/4 \approx \pi(d_m^2 - 4\Delta_i d_m)/4$ at the throat section. Hence, when it is assumed that the flow volume passing through the passage area A is Q and the velocity of the flow is U, $Q \approx AU$ is obtained; when it is assumed that the same flow volume Q flows in the passage area $A_i$ at the velocity $U_i$ of the flow, $U_i$ is represented by $U_i = U(d_m^2/(d_m^2 - 4\Delta_i d_m)) \approx U(1+4\Delta_i/d_m) \approx U(1+44\Delta_i d)$ because of the relationship of $Q=A_i U_i$.

More specifically, the Reynolds number of the flow in the rotator having the cycloid curve m is $Re=dU/\nu$, and that of the flow in the rotator having the internal curve i is $Re'=d_i U_i/\nu U d(1-2\Delta_i/d)/\nu$.

In consideration of the Reynolds number of a wind turbine, for example, the diameter of a 5 kW wind turbine is d=1 m, the average wind velocity thereof is 5 m, and the kinematic viscosity coefficient $\nu$ thereof (at 25° C.) is $15\times10^{-6}$; hence, Re is approximately $Re=3.3\times10^5$. Since the diameter of a wind turbine being practically used is considerably larger than this, Re generally has a value of $Re=10^6$ or more. Moreover, even if two Reynolds numbers of approximately $Re=10^5$ or more have a difference of 1000 therebetween in a common passage, no essential change usually occurs in the flow. This is based on the following reason: the nature of the flow changes significantly from a laminar flow to a turbulent flow at a Reynolds number of approximately 3000; in the case of flows having Reynolds numbers fairly larger than this value, even if their Reynolds numbers are different from each other by 1%, no significant effect is produced.

More specifically, in the flows having $Re=10^5$ or more, if the difference is approximately $(Re'-Re)/Re<10^{-2}$, the difference hardly causes any difference between the patterns of the two flows around the wind turbine. In the above-mentioned thin casing, this corresponds to $(Re'-Re)/Re=2\Delta_i/d<10^{-2}$ and can be rephrased that the ratio of the inner thickness to the radius is 1% or less. For example, if $\Delta_i<5$ mm when d=1000 mm, a flow equivalent to that formed by the cycloid casing can be formed using the thin casing. When the diameter d=1000 mm, a tube length of 10% means that the tube length Lt=100 mm; in this case, $\Delta_i/Lt=5/100=0.05$. When it is assumed that the outer thickness $\Delta_k$ is equal to $\Delta_i$, for example, the thickness $\Delta$ of the thin casing is $2\Delta_i$. At this time, $\Delta/Lt=0.1$. As $\Delta_i$ becomes smaller, the shape becomes closer to that of the cycloid casing; hence, in the case that the total thickness $\Delta$ of the thin casing is approximately 10% of Lt or smaller, the thin casing can be said to be a thin casing that does not change the pattern of the flow. $\Delta_i$ may be 0, and at this time, the internal curve i is configured by the cycloid curve m itself. Furthermore, in the case that the thickness is negligible, it can be rephrased that the internal curve i the cycloid curve m≈the external curve k.

Next, the shape of the outer circumferential face 202 of the casing 2 will be described. The shape of the outer circumferential face 202 is also expanded along the cycloid curve m so as to be curved into a concave shape approximately in the range from the front edge 2b to the rear edge 2d. The outer circumferential face 202 is curved appropriately; if separation occurs at the rear edge 2d, the intended vortex street flow can be formed. Various cross-sectional shapes can be adopted. However, in the wind turbine 1 or other fluid machines, the thickness of the casing 2 becomes a factor for increasing its weight. In addition, if the pressure loss due to wind is excessively large, its practicality is lost.

Hence, an outflow gradient $\theta_1$ for allowing the external flow to be separated at the position of the rear edge 2d is formed at the rear edge 2d. $\theta_1$ is an intersection angle of the direction of the tangent line q of the external curve k and the axial direction (refer to FIG. 2 and FIG. 3(b)). Furthermore, in Embodiment 1, for the purpose of making the casing shape thinner, this outflow gradient $\theta_1$ is set so as to be equal to or more than the expansion angle $\beta$ serving as the intersection angle of the generatrix line n of the conical face connecting the front edge 2b to the rear edge 2d and the axial direction (more specifically, β<θI). In FIG. 3(b), the value of tan β is appropriately tan β=(h≈D)/Lt. Hence, the fluid resistance is reduced, and effective vortex street formation can be accomplished. In relation to this, in the case of the casing 2 featuring an impractical configuration having an excessive weight, causing an useless pressure loss and going beyond the boundaries of an ordinary fluid machine, for example, having an expansion angle β of more than 50°, the external flow is blocked by its basic structure (refer to FIG. 3(b); the projected width D viewed from the main flow is large with respect to the inside diameter d of the throat section 2a), its fluid resistance becomes large and disturbs the main flow, the downstream flow expands outward more widely than those shown in FIGS. 4 and 6, the vortices of the generated vortex streets are weak, the cell pressure in the negative pressure region does not become very low, and the cell structure becomes ambiguous. Hence, although an ordinary fluid machine falls naturally within the above-mentioned ranges and no problem occurs, even in the case that an unsteady flow is utilized, it is necessary not to break the flow, thereby avoiding meaningless pressure loss, and it is found that the external shape of the casing has a range that preferably be avoided for vortex street formation. The case in which the expansion angle β is more than 50° corresponds to a case in which the tube length is relatively small, for example, a case in which the height h of the flange is more than 15% as in the case of the flanged casing having a tube length of 13.7% (that is, the flanged casing having a flange height of 15% and a tube length of 13.7%); the expansion angle β at this time is approximately 51°. It is preferable that β<40° (this will be described later). However, in the case of an exceptional fluid machine that is not required to have practicality, the expansion angle exceeding 50° becomes useful.

The outflow gradient θ1 is required to be an angle in which the separation of the flow is stabilized at the rear edge 2d and this is caused steadily. Hence, the outer circumferential face 202 of the casing 2 is required to have a shape so that the external flow is separated from the rear edge 2d and the external flow, together with the internal flow separated from the inner circumferential face 201, generates rolling behind the casing 2 to form vortex streets having strong vortices in the downstream. More specifically, the internal flow on the inner circumferential side of the cycloid shape is coordinated with the external flow using the cycloid and θ1 and θ2, and strong vortex streets are formed; by virtue of this action, the velocity of the internal flow is increased. Hence, in the case of a shape, the outer circumferential face 202 of which protrudes convexly outward in the radial direction, there is a danger that the separation point moves from the rear edge 2d to the upstream side and that an excessive weight and useless pressure loss are caused; the shape is thus undesirable. In the case of Embodiment 1, the outflow gradient θ1 is set to the expansion angle β or more, and there is no such danger.

Furthermore, conversely, when a thin casing having a shape satisfying the conditions of the outflow gradients θ1 and θ2 is given, and when a cycloid curve having the front edge 2b and the rear edge 2d used as end sections and having a convex portion at the throat section is assumed to be present inside the casing, if the entire cycloid curve is fitted inside the region of the external surface of the cross-section thereof as a single curve (including a case in which the cycloid curve is used to configure the internal surface itself or the internal and external surfaces), the cycloid curve of the generatrix line in which both ends (the front edge 2b and the rear edge 2d) and the throat section are fixedly determined is unique; hence, it can be said that this cycloid curve is a curve inherent in the cross-sectional shape of the casing, and it can also be said that the casing is set by using the cycloid curve as a reference line. The small thickness is a thickness obtained when the conditions of the above-mentioned outflow gradients θ1 and θ2 are satisfied; as described above, the thickness being equal to or less than 10% of Lt is preferable.

In the case that a small curve (round portion) is formed at the rear edge 2d, the gradient of the tangent line of the outer circumferential face 202 at the position where this round portion is started becomes the outflow gradient θ1. Furthermore, in the case that the rear edge is a flat end face having a thickness, the outer circumferential edge of the end face has a shape in which the condition of the above-mentioned outflow gradient θ1 is satisfied. The flow is similar to that obtained in the case that the rear edge has no thickness. Moreover, it is preferable that the front edge is formed into a pointed shape or a small round curved shape capable of smoothly separating the flow; however, if the entire flow of the vortex streets is intensified, a cut end shape having a flat end face, for example, may be used. Furthermore, a unique case in which the casing is has a thickness and its inner circumferential face itself is formed of a cycloid curve by using the cycloid curve as the generatrix line will be described in Embodiments 2 and 3.

As described above, in the fluid machine and the wind turbine according to Embodiment 1 of the present invention, the shapes of the inner circumferential face and the outer circumferential face are determined on the basis of the cycloid curve in the axial cross-section as the reference shape of the casing; hence, vortex streets having strong vortices are formed by the separation of the internal and external flows, and a negative pressure region having high vorticity is formed behind the vortex generating face by the vortex streets, whereby the velocity of the internal flow can be increased. A fluid machine and a wind turbine being lightweight and compact can thus be provided. Moreover, the length of the diffuser can be made smaller, the size can be made larger, and the output can be raised.

Still further, in the method for increasing the velocity of the internal flow according to Embodiment 1, a vortex street flow having stable and strong vortices is formed in the flow depending on the shape of the casing, a strong negative pressure region is formed in the vicinity of the outlet, whereby the velocity of the internal flow can be increased by the vortex street flow that is an unsteady flow.

Embodiment 2

Figure 11:
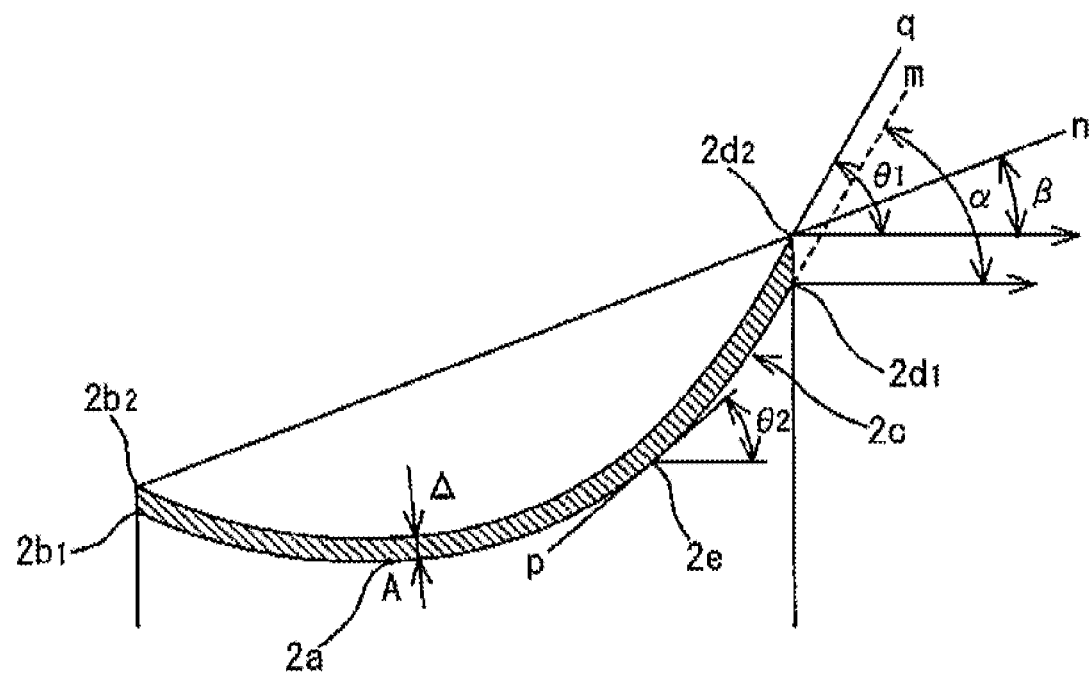
FIG. 11 is an axial sectional view a cycloid casing of a fluid machine according to Embodiment 2 of the present invention.

According to Embodiment 2 of the present invention the casing of a fluid machine or a wind turbine described above is formed of a plate having a predetermined thickness in the radial direction, and the shape itself on the inner circumferential side including the vortex generating face is formed of a cycloid curve. Hence, it is basically the same as Embodiment 1. FIG. 11 is an axial sectional view showing a casing made of a plate, formed into a cycloid curve and provided between the front edge and the rear edge of a fluid machine according to Embodiment 2 of the present invention. Although a wind turbine is also described mainly in Embodiment 2, the description is similarly applicable to other fluid machines, such as a water turbine.

As shown in FIG. 11, a plate having a predetermined thickness Δ can be formed into a cycloid shape. Although the casing having a cycloid shape has already been described, the inner circumferential face 201 is formed into a cycloid shape using the plate in Embodiment 2. Although the plate has the predetermined thickness Δ, the thickness Δ is usually regarded as a negligible thickness in consideration of the scale for the typical dimensions of fluid machines. More specifically, the ratio of the plate thickness to the radius of the throat section is usually equal to or less than 0.5%, and the casing is formed assuming that Δ≈0. Hence, the plate having the predetermined thickness Δ described blow corresponds to a case in which the ratio of the plate thickness to the radius of the throat section is more than 0.5%, for example. In FIG. 11, the inner circumferential face 201 has the cycloid curve m connecting the inner end $2b_1$ of the front edge to the inner end $2d_1$ of the rear edge. The throat section 2a is present at the position S of the minimum cross-sectional area in which the cross-section of the flow passage inside the inner circumferential face 201 is minimal.

In the case of the plate, the outer circumferential face 202 also has a cycloid curve being parallel with the inner circumferential face 201 and away therefrom by the thickness Δ. At this time, the gradient of the conical generatrix line connecting the outer end $2b_2$ of the front edge to the outer end $2d_2$ of the rear edge is set to the expansion angle β. The vortex generating face 2c is in the range of a predetermined length from the rear edge 2d of the inner circumferential face 201. The end of the vortex generating face 2c on the inside diameter side thereof is the front end 2e of the vortex generating portion. The boundary layer of the internal flow develops from around the throat section 2a, and the internal flow reaches the front end 2e of the vortex generating portion.

In the case of the cycloid shape, the flow is separated at the front end 2e of the vortex generating portion by directly using part of the inner circumferential face 201 as the vortex generating face 2c, whereby very effective and strong vortex streets can be formed. The vortex generating face 2c is not required to be formed into a shape other than the cycloid. The front end 2e of the vortex generating portion can be used as the separation point by just adopting the cycloid shape. At this time, θ2=θem as in the case of Embodiment 1. The separated internal flow, together with the external flow separated at the outer end $2d_2$ of the rear edge of the outer circumferential face 202, causes rolling behind the casing 2, whereby Karman vortex streets are formed on the downstream side and a negative pressure region having high vorticity and arranged in an annular direction is formed immediately behind the vortex generating face 2c. The cycloid casing has the outflow gradient θ2 being in the direction of the tangent line p at the front end 2e of the vortex generating portion of the cycloid curve m.

Next, the outer circumferential face 202 has a shape formed along the cycloid curve m of the inner circumferential face 201 and being away therefrom by the thickness Δ in the radial direction. Since the external flow around the outer end $2b_2$ of the front edge and the outer end $2d_2$ of the rear edge, the outflow gradient θ1 is formed at the outer end $2d_2$ of the rear edge as can be understood as in the case of Δ=0. As shown in FIG. 11, the outflow gradient θ1 becomes equal to the outflow gradient α of the cycloid curve m. The external flow is separated at the outer end $2d_2$ of the rear edge. Furthermore, the gradient is set so as to be equal to or less than the expansion angle β of the conical generatrix line connecting the outer end $2b_2$ of the front edge to the outer end $2d_2$ of the rear edge.

Furthermore, the vortex generating face 2c of the plate-shaped casing having the cycloid curve may be formed in the vertical direction so as to have the shape of the flanged casing shown in FIG. 8 and may be provided with a flange (disc) in a range that η<40° is satisfied as shown in FIG. 2, although this configuration is not shown in FIG. 11. It is important that the shape is formed in the range that β<40° is satisfied, as described in Embodiment 3. Hence, a plate-shaped flanged cycloid casing having the thickness Δ (including Δ≈0) is obtained. Even in this case, a stable and strong negative pressure region can be formed and excellent characteristics are exhibited. Moreover, it may be possible that the flange is not installed so as to be orthogonal (disc) to the axis of the impeller but is inclined with respect to the axis so that the flange has a conical face. Even in the case of this flanged cycloid casing, a secondary flow having high circularity can be pulled in from the downstream side as in the case of the cycloid casing, and a stable and strong negative pressure region can be formed.

In Embodiment 2 of the present invention, in the case that the front edge 2b and the rear edge 2d have the thickness Δ having a predetermined value in the radial direction in the axial cross-section (more specifically, when there are the inner end $2b_1$ of the front edge, the inner end $2d_1$ of the rear edge, the outer end $2b_2$ of the front edge and the outer end $2d_2$ of the rear edge), the inner circumferential face 201 is formed into a cycloid shape connecting the inner end $2b_1$ of the front edge to the outer end $2d_1$ of the rear edge; hence, suitable vortex generation characteristics by virtue of the cycloid can be provided, and a vortex flow having strong vortices and a negative pressure region can be generated. In addition, the casing can be designed and produced easily.

The flanged casing is herein compared with the cycloid casing by wind tunnel experiments and numerical calculations, and the fact that the cycloid shape has excellent characteristics is described in addition to the description of Embodiment 1. The flanged casing and the cycloid casing subjected to the wind tunnel experiments and the numerical calculations have the shapes shown in FIG. 8.

Figure 12A:
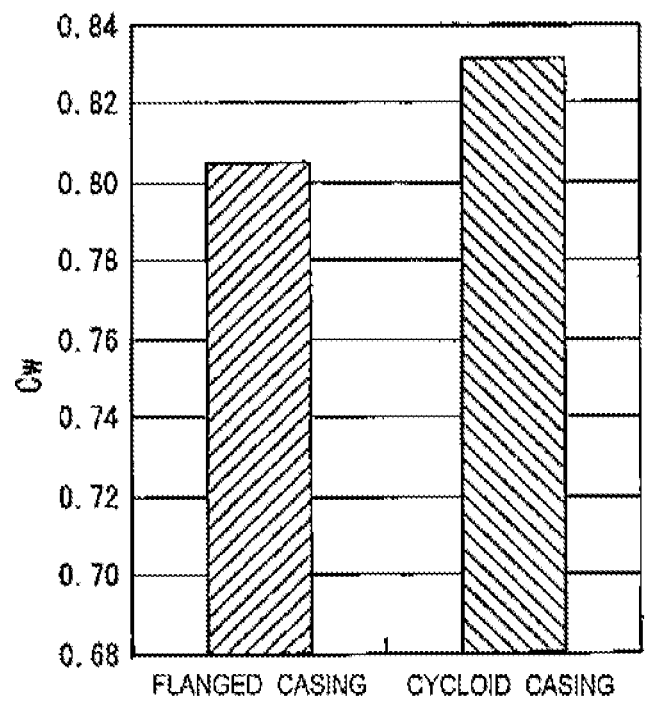
FIG. 12(a) is a diagram showing experimental results of wind turbine output coefficients obtained by wind tunnel experiments.
Figure 12B:
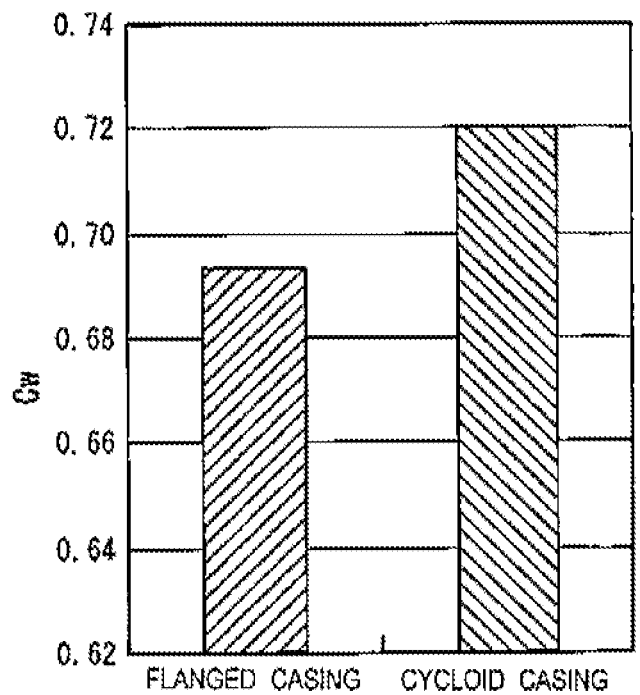
FIG. 12(b) is a diagram showing the results of wind turbine output coefficients obtained by numerical calculations.

The wind turbine output coefficients Cw of the wind turbines equipped with these two casings are as shown in FIGS. 12(a) and 12(b). FIG. 12(a) shows the results of the wind tunnel experiments, and FIG. 12(b) shows the results of the numerical calculations. According to the results of the wind tunnel experiments shown in FIG. 12(a), it is found that the wind turbine output coefficient Cw of the cycloid casing is larger than the wind turbine output coefficient Cw of the flanged casing shown in FIG. 8. The rate of the increase is 3.2%. This trend is similar in the numerical calculations shown in FIG. 12(b), and the rate of the increase is 2.9%. Hence, it is expected that the wind turbine output coefficient Cw is raised approximately 3% by simply using the cycloid casing. The wind turbine output coefficient Cw is herein a dimensionless quantity and represented by $Cw=W/\{(1/2)\cdot\pi\rho U^3 r_0^2\}$. W is a power output (W), ρ is an air density (kg/m³), $r_0$ is the radius of the impeller (m), and U is a wind velocity (m/s).

Figure 13:
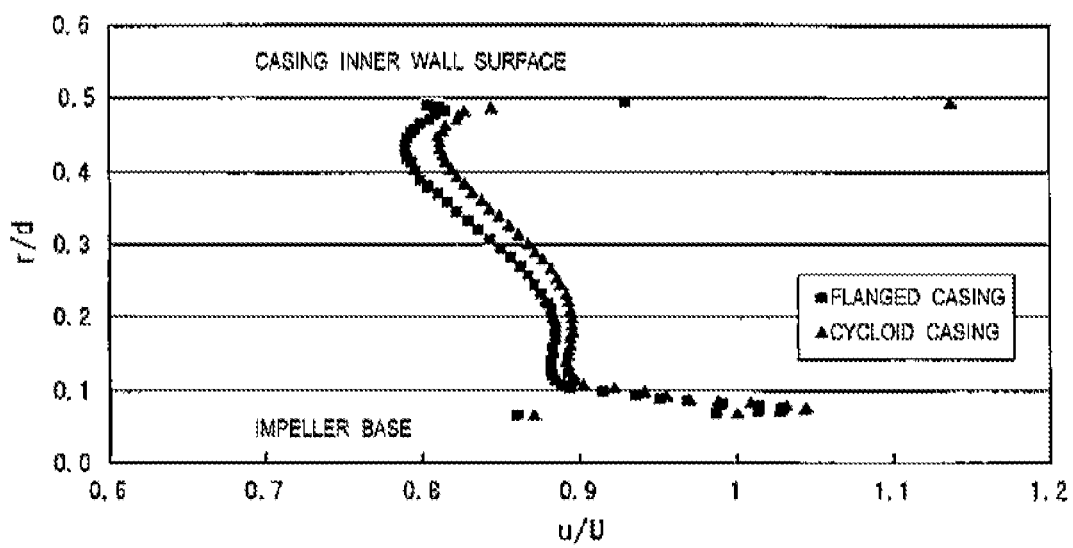
FIG. 13 is a chart of velocity distribution in the radial direction at the throat section of the cycloid casing of the fluid machine according to Embodiment 2 of the present invention.

Then, the velocity distribution and the pressure distribution in the radial direction at the throat sections of the wind turbines equipped with the two casings are obtained by numerical calculations. FIG. 13 shows velocity distribution in the radial direction at the throat sections, and FIG. 14 shows pressure distribution in the radial direction at the throat sections.

According to FIG. 13, in the range from the nacelle wall surface of an impeller of r/d=0.065 to the inner circumferential face of a casing of r/d=0.5, the increase in the velocity u (m/s) of the flow in the cycloid cross-section is larger (a distinguished trend being approximately proportional to the radius r), and in the vicinity (r/d=0.5) of the distal end of the impeller, u/U has increased by 20% or more.

Figure 14:
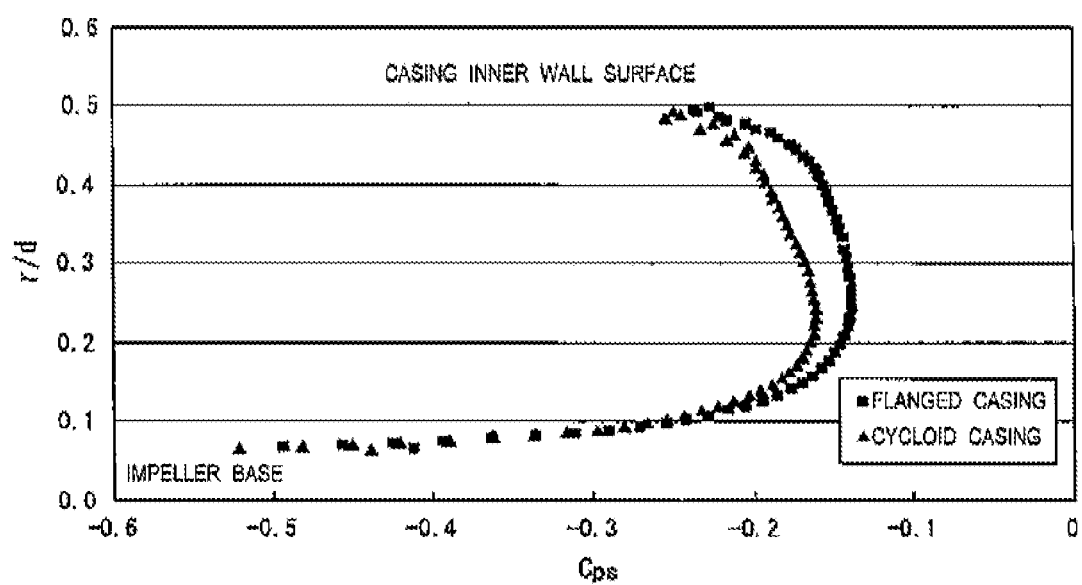
FIG. 14 is a chart of pressure distribution in the radial direction at the throat section of the cycloid casing of the fluid machine according to Embodiment 2 of the present invention.

Furthermore, according to FIG. 14, it is found that in the range from the nacelle wall surface of the impeller to the inner circumferential face of the casing of r/d=0.5, the static pressure CPs of the cycloid casing is lower (a distinguished trend being approximately proportional to the radius r). Hence, it can be recognized that the effect of pulling the flow into the wind turbine in the case of the cycloid casing is larger than that in the case of the flanged casing.

Furthermore, the pressure distribution averaged with respect to time and the vorticity distribution averaged with respect to time and averaged with respect to circumferential direction around the two wind turbines have already been shown in FIGS. 4 and 5 and in FIGS. 9 and 10. According to FIGS. 4 to 7, FIG. 9, FIG. 10, FIG. 13 and FIG. 14, it is found that the negative pressure of the negative pressure region generated by the cycloid casing having the cycloid cross-section is stronger than that generated by the flanged casing (refer to FIG. 3(b)) having a flange height of 10% and a tube length of 13.7%, the projected width D of which is the same as that of the cycloid casing, and it is also found that the negative pressure region expands close to the throat section along the wall surface of the inner circumferential face of the casing. Moreover, it is found that the vorticity in the negative pressure region of the flanged casing is relatively high and that the region is formed so as to be thin and extended long on the downstream side in the vicinity of the distal end of the impeller. On the other hand, in the case of the cycloid casing, behind the vortex generating face, a region having very strong vorticity is formed from the inner circumference to the outer circumference in the vicinity of the outlet close to the face. Hence, it is found that this negative pressure region having the strong vorticity in the cycloid casing increases the velocity of the flow at the throat section, whereby the output of the wind turbine is increased.

The chart showing the flow lines around the flanged casing having a flange height of 10% and a tube length of 13.7% has already been described on the basis of FIG. 6, and the chart showing the flow lines around the cycloid casing formed of the plate having the predetermined thickness according to Embodiment 2 has been described on the basis of FIG. 7. In the case of the flow around the flanged casing, its main flow is significantly disturbed due to the existence of the casing and expands rearward, and the flow is blocked by the flange. On the other hand, the cycloid casing has an appropriate shape not disturbing the flow more than necessarily, and the jumping out angle of the flow from the rear edge is directed in a more inward direction. In the case of the cycloid casing, the flow jumping out from the upper face of the rear edge of the casing is smooth and quick. Hence, vortices are formed immediately close to the vortex generating face 2c, and the internal flow merges with the external flow smoothly in a time-averaged manner on the downstream side in the range of approximately one to two times the axial length of the casing. With this action, the velocity of the flow at the throat section is increased, and the output of the wind turbine is increased.

Also in the numerical calculations described above, it is found that the performance of the wind turbine is improved by the cycloid casing in which the vortex generating face is integrated with the diffuser. The cycloid casing improves the performance of creating the negative pressure region, thereby being excellent in the vortex formation characteristics.

Figure 15A:
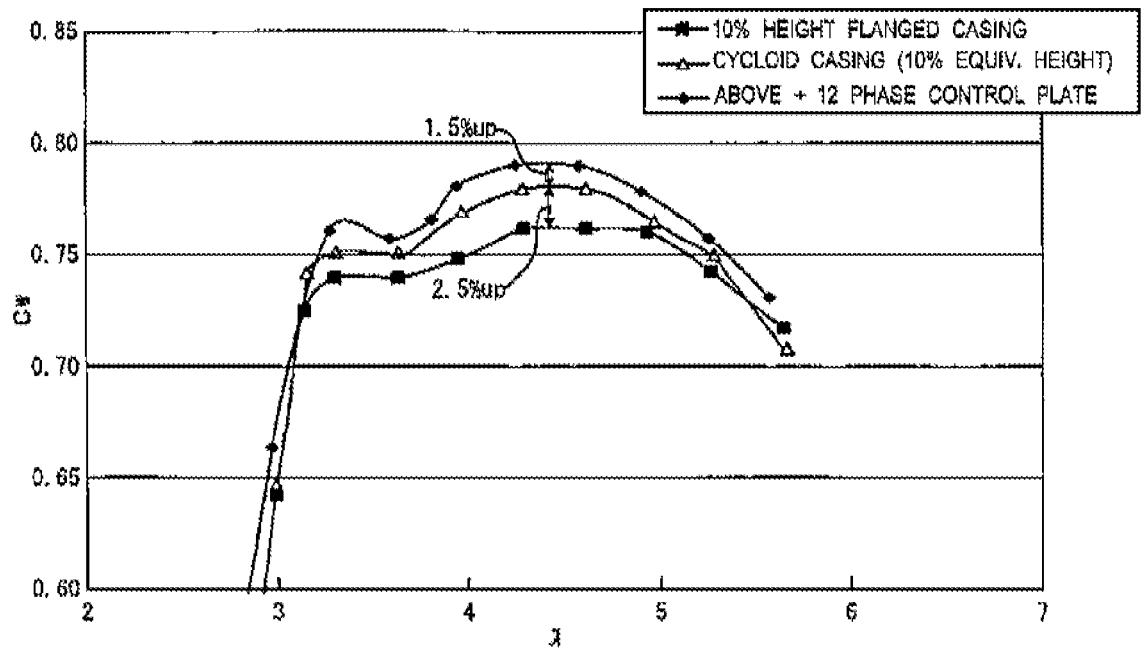
FIG. 15(a) is an explanatory diagram comparing output performances of the fluid machine of Embodiment 2 of the present invention with phase control plates, without phase control plates, and the flanged.
Figure 15B:
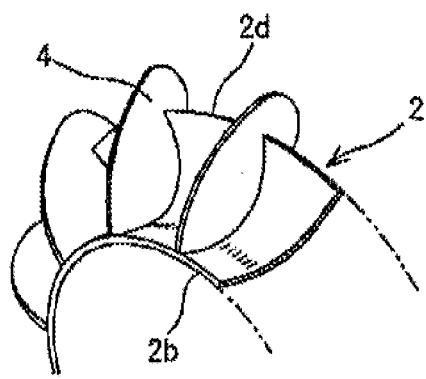
FIG. 15(b) is an external view of the casing equipped with the phase control plates.

FIG. 15(a) is an explanatory view wherein a case in which phase control plates 4 for adjusting vortex fluctuations in the wind turbine according to Embodiment 2 of the present invention are provided, a case in which the plates are not provided, and a case in which the flanged casing according to Embodiment 1 is used are compared with respect to output performance. The external view of the casing 2 equipped with the phase control plates 4 is shown in FIG. 15(b). The casing 2 shown in FIGS. 15(a) and 15(b) is equipped with 12 phase control plates 4. As shown in FIG. 15(b), the plates are provided at predetermined pitches so as to be formed in the axial direction and upraised on the downstream side of the vortex generating face 2c of the casing 2 made of the plate and having the cycloid shape. The circumferential velocity ratio λ in FIG. 15(a) is the ratio (=$r_0\omega/U$) of the circumferential velocity $r_0\omega$(m/s) of the impeller to the wind velocity U(m/s). Herein, $r_0$ is the radius of the impeller, and ω is an angular frequency (1/s).

The height h of the flange constituting the vortex generating face 2c of the flanged casing having a flange height of 10% and a tube length of 13.7% is 10% of the diameter d of the throat section 2a (h/d=0.1). Furthermore, also in the casing having a cycloid cross-section and wholly formed of only the smooth rotation face of a cycloid curve, its rear edge is on the cycloid, and the height h of the portion corresponding to the vortex generating face 2c amounts to 10% of the diameter d of the throat section 2a. More specifically, the outermost diameters (the positions of the rear edges) of the casings 2 including the vortex generating faces 2c have the same height (refer to FIG. 4). The wind velocity is 8 (m/sec), and the diameter of the impeller 3 is 1000 mm. Referring to FIG. 15, the output coefficient Cw is expected to increase by 2.5% on average by using the cycloid curve. The coefficient increases further approximately by 1.5% by providing the phase control plates. Although the above-mentioned description is applied to the case in which the flanged casing according to Embodiment 2 is equipped with the phase control plates 4, the working effect of the phase control plates 4 is also obtained similarly in Embodiment 1 and Embodiment 3 described later and in other fluid machines.

If the number of the phase control plates is made larger than the number of the cells in the negative pressure region formed by the natural flow, the original cells are forcibly divided, and the vortices on the downstream side do not become so strong. The negative pressure region becomes less noticeable. Furthermore, even in the case that the number of the phase control plates is made smaller than the number of the cells, the plurality of cells expand, contract, move and interact mutually and become less stable; even in this case, the vortices become not stronger than in the case that the numbers are the same. Hence, it is preferable that the number of the phase control plates to be provided be the number corresponding to the number of the negative pressure regions that are naturally formed. The 12 phase control plates 4 have been selected from this point of view.

As described above, in the fluid machine according to Embodiment 2, the casing can be designed and produced easily and the flow for forming vortex streets can be made stable by using the rotation face of the cycloid curve, whereby the velocity of the internal flow can be increased and high output power generation can be carried out. Furthermore, the length of the diffuser can be made smaller, whereby not only micro and mini wind turbines of several meters or less but also wind turbines for large wind-power generation apparatuses having a power generation capacity or megawatt can be made large in size, and the energy conversion ratio thereof can be raised. Moreover, with the method for increasing the velocity of the internal flow of the fluid machine according to Embodiment 2, the flow for forming the vortex streets can be made more stable by using the cycloid curve for the entire casing, and the velocity of the internal flow can be increased by the external flow of the fluid machine.

Embodiment 3

Figure 16A:
FIG. 16(a) is a diagram showing the profile of a flanged casing having a flange height of 10% and a tube length of 13.7%.
Figure 16B:
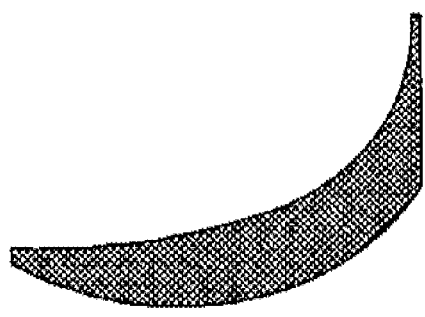
FIG. 16(b) is a diagram showing the profile of a thick cut end casing of a fluid machine according to Embodiment 3 of the present invention.
Figure 17:
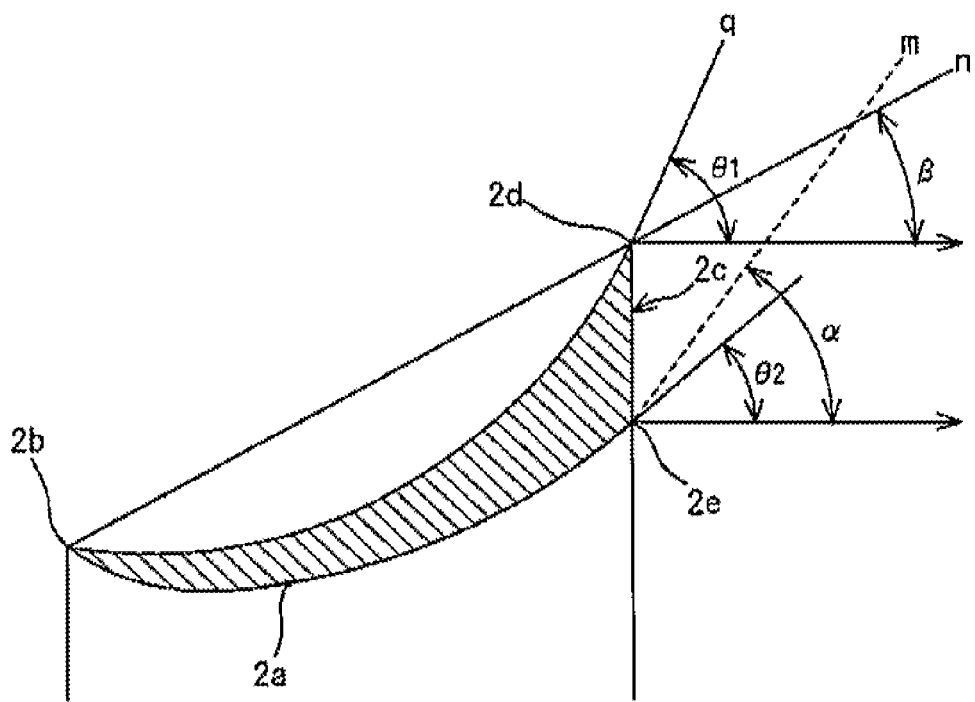
FIG. 17 is an axial sectional view of the thick cut end casing of the fluid machine according to Embodiment 3 of the present invention.

Next, according to Embodiment 3 of the present, the thickness of the casing of the fluid machine is changed, and a flange-shaped vortex generating face is formed. The face has a shape of a thick cut end cross-section, the thickness of which is increased gradually and decreased suddenly. FIGS. 16(a) and 16(b) are comparison views in which the shape of a flanged casing having a flange height of 10% and a tube length of 22% is compared with the shape of a casing having the thick out end cross-section according to Embodiment 3, and FIG. 17 is an axial sectional view showing the thick cut end casing provided between the front edge and the rear edge of the fluid machine according to Embodiment 3 of the present invention. Hereafter, the shape being made thicker gradually and having the thick cut end cross-section (hereafter also referred to as a banana-shaped cross-section) for forming the flange-shaped vortex generating face at the rear edge will be described.

FIGS. 16(a) and 16(b) show the shapes of the flanged casing having a flange height of 10% and a tube length of 22% and the casing having the banana-shaped cross-section. for comparison. Although the casing shown in FIG. 16(a) is similar to the plate-shaped casing having a flange height of 10% and a tube length of 13.7% according to Embodiment 2, it is a flanged casing in which the axial length of the casing amounts to 22% of the inside diameter d of the throat section 2a. The position of the throat section amounts to 0.89d from the front edge. The inner circumferential face of the banana-shaped cross-section according to Embodiment 3 has a cycloid shape, and the outer circumferential face has an elliptical cross-sectional shape shown in FIG. 16(b) and has a gradient being horizontal to the axis at the front edge on the inlet side. The vortex generating face 2c formed behind the banana-shaped cross-section is vertical as in the case of the flange. In addition, a round portion (curve) is formed at the front edge of the banana-shaped cross-section. Furthermore, it is preferable that the front end 2e of the vortex generating portion be disposed at the separation point of the cycloid shape if possible or in front of the point.

Figure 18:
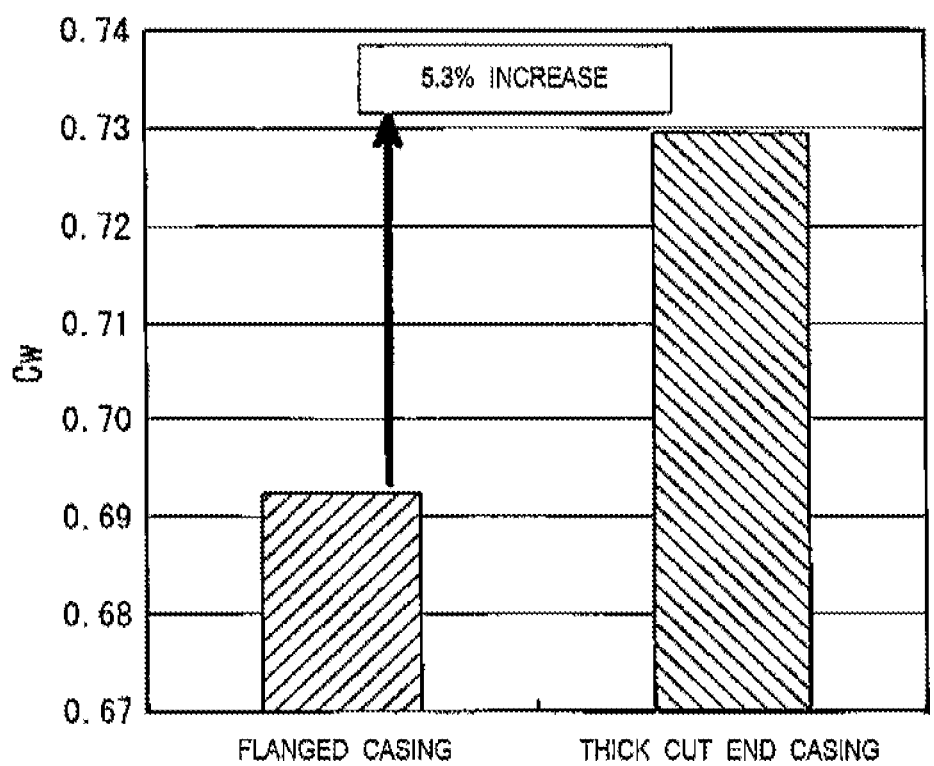
FIG. 18 is a diagram comparing the output coefficient of the fluid machine equipped with the flanged casing of FIG. 16(a) having a flange height of 10% and a tube length of 13.7% and the output coefficient of the fluid machine equipped with the thick cut end casing of FIG. 16(b)

The wind turbine output coefficients Cw of the wind turbines equipped with the two casings are obtained by numerical calculations as shown in FIG. 18. The numerical calculations are performed using the RIAM-COMPACT numerical simulator developed by Kyushu University Research Institute for Applied Mechanics, also using high Reynolds number analysis software adopting the LES method serving as the most advanced turbulence model, and further using the DNS method for performing direct numerical calculations without using any turbulence models. The results of the calculations shown in the figures are based on the DNS method, and the LES method is used for reference. According to FIG. 18, in the case that the casing is changed so as to have the banana-shaped cross-section, it is found that the wind turbine output coefficient Cw is higher by 5.3% than that of the flanged casing having a flange height of 10% and a tube length of 22%. Even in the case that the vortex generating face is slightly inclined from the vertical plane, almost the same result is obtained.

Figure 19:
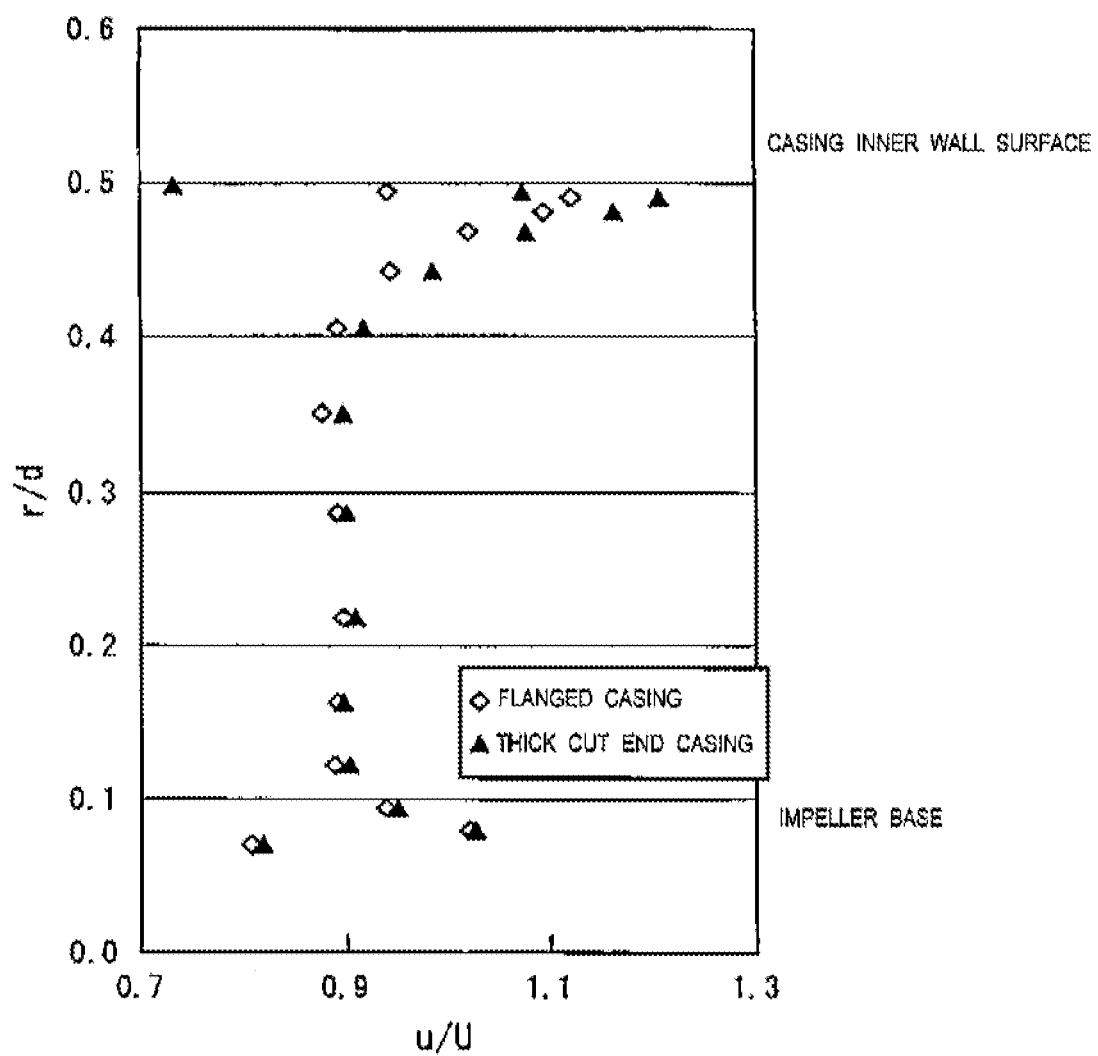
FIG. 19 is a chart of velocity distribution in the radial direction at the throat section of the thick cut end casing of the fluid machine according to Embodiment 3 of the present invention.

Then, the velocity distributor, and the pressure distribution in the radial direction at the throat sections of the wind turbines equipped with the two casings are obtained by numerical calculations. FIG. 19 shows the velocity distribution in the radial direction at the throat section, FIG. 20 shows the pressure distribution in the radial direction at the throat section, and FIG. 21 shows the pressure distribution in the radial direction at a position, x/d=0.006, corresponding to an approximately intermediate position of the diffuser on the downstream side from the throat section.

According to FIG. 19, in the range from the nacelle wall surface of an impeller of r/d=0.065 to the inner circumferential face of a casing of r/d=0.5, the increase in the velocity u of the flow in the banana-shaped cross-section is larger (a distinguished trend being approximately proportional to the radius r); hence, in the case that the casing is provided with a thickness having the shape of the thick cut end cross-section, it is found that the velocity of the flow at the throat section becomes higher than that in the case of the flanged casing.

Figure 20:
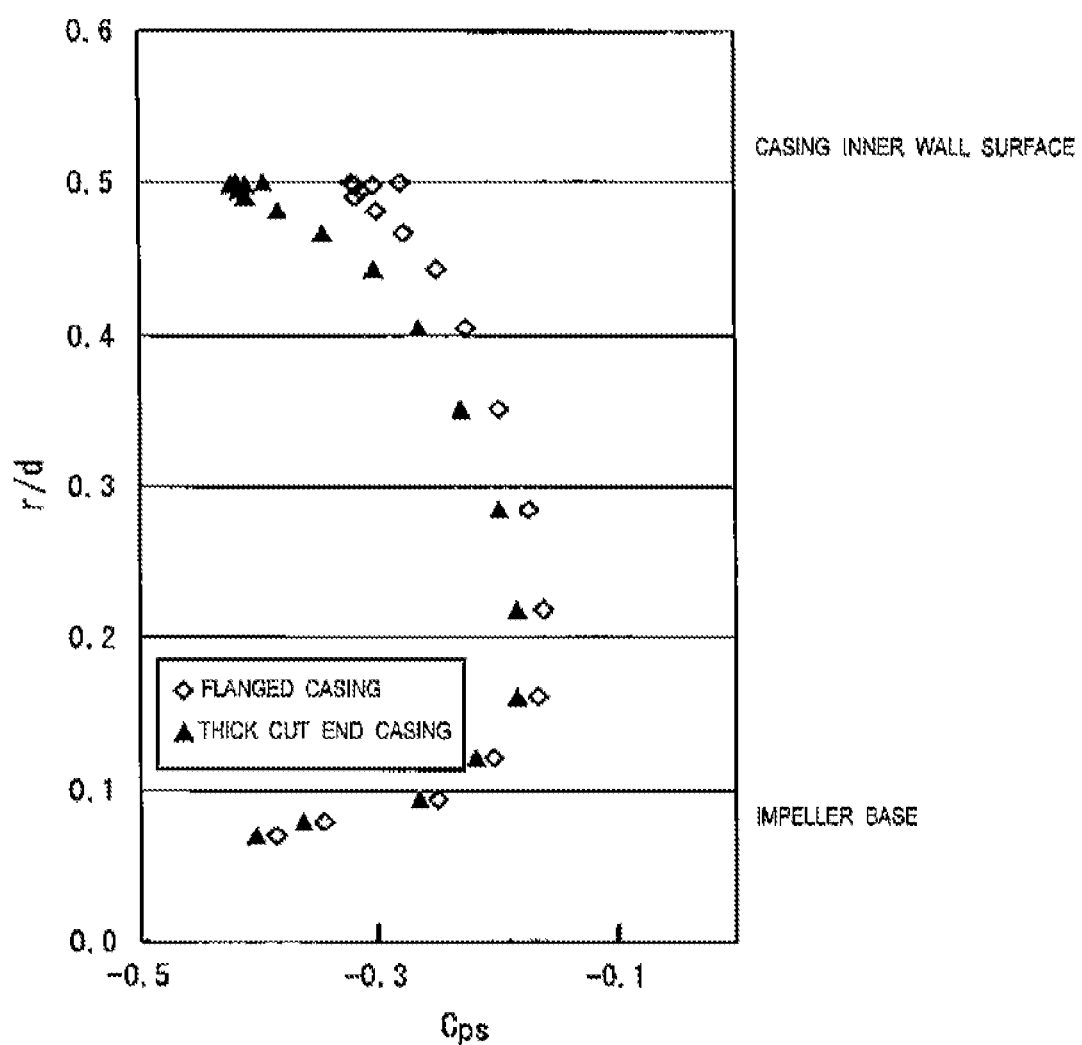
FIG. 20 is a chart of pressure distribution in the radial direction at the throat section of the thick cut end casing of the fluid machine according to Embodiment 3 of the present invention.
Figure 21:
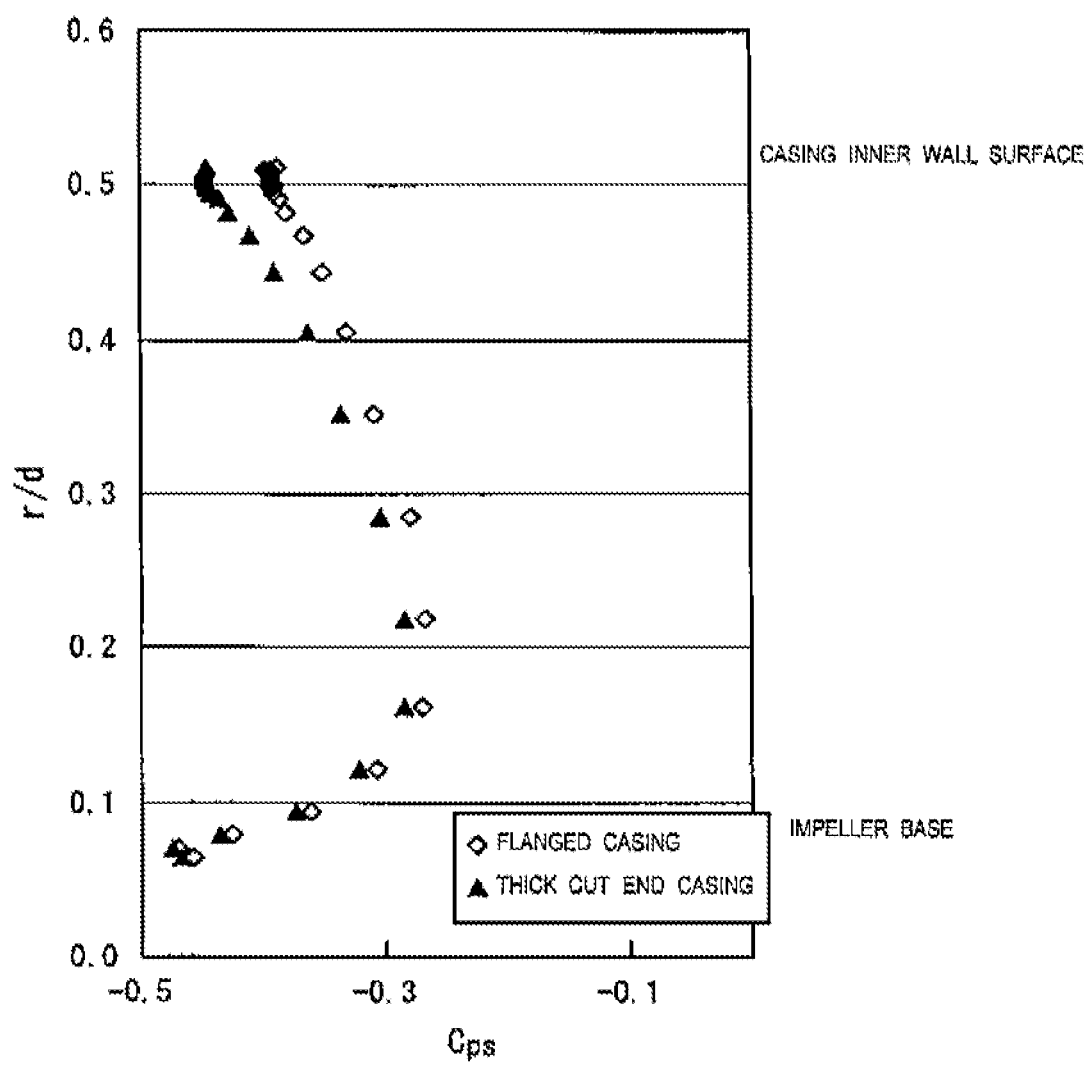
FIG. 21 is a chart of pressure distribution in the radial direction at a position downstream of the throat section of the thick cut end casing of the fluid machine according to Embodiment 3 of the present invention and substantially at the middle of the diffuser.

Furthermore, according to FIGS. 20 and 21, in the range from the nacelle wall surface of the impeller to the inner circumferential face of the casing 2 of r/d=0.5, at the throat section and even at the approximately intermediate position of the diffuser on the downstream side from the throat section, the static pressure Cps in the vicinity of the wall surface of the diffuser of the casing having the thick banana-shaped cross-section is lower (a distinguished trend being approximately proportional to the radius r); hence, it is found that the pulling effect of the flow in the casing having the banana-shaped cross-section is larger than that in the flanged casing having a flange height of 10% and a tube length of 22%.

Figure 22:
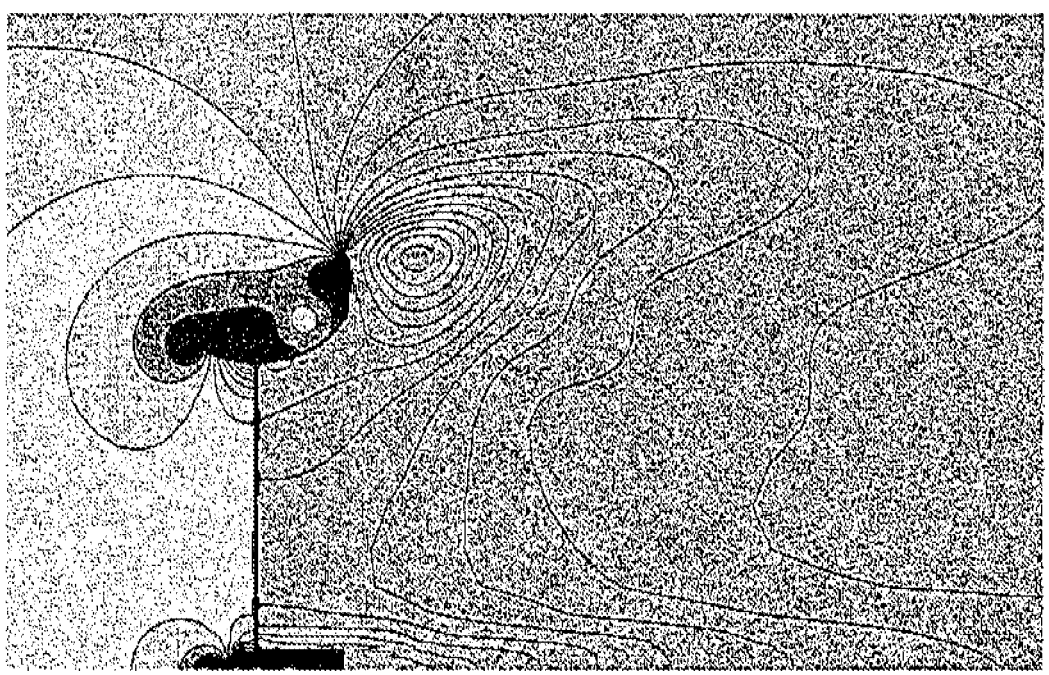
FIG. 22 is a chart of pressure distribution averaged with respect to time around the fluid machine equipped with the flanged casing of FIG. 16(a) having a flange height of 10% and a tube length of 22%.
Figure 23:
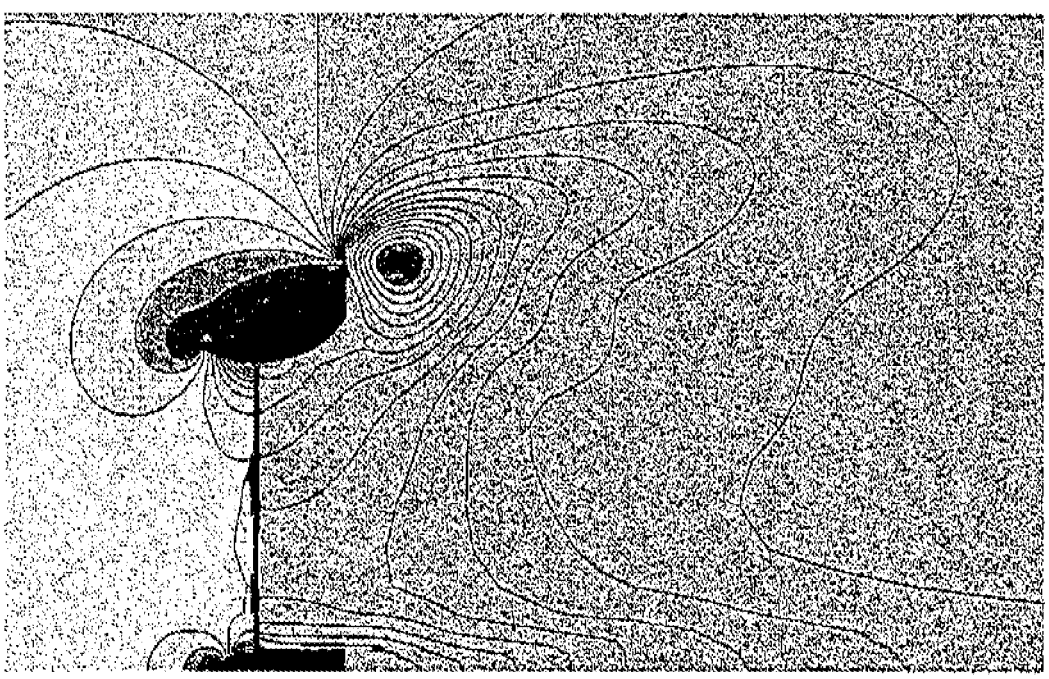
FIG. 23 is a chart of pressure distribution averaged with respect to time around the fluid machine according to Embodiment 3 of the present invention.
Figure 24:
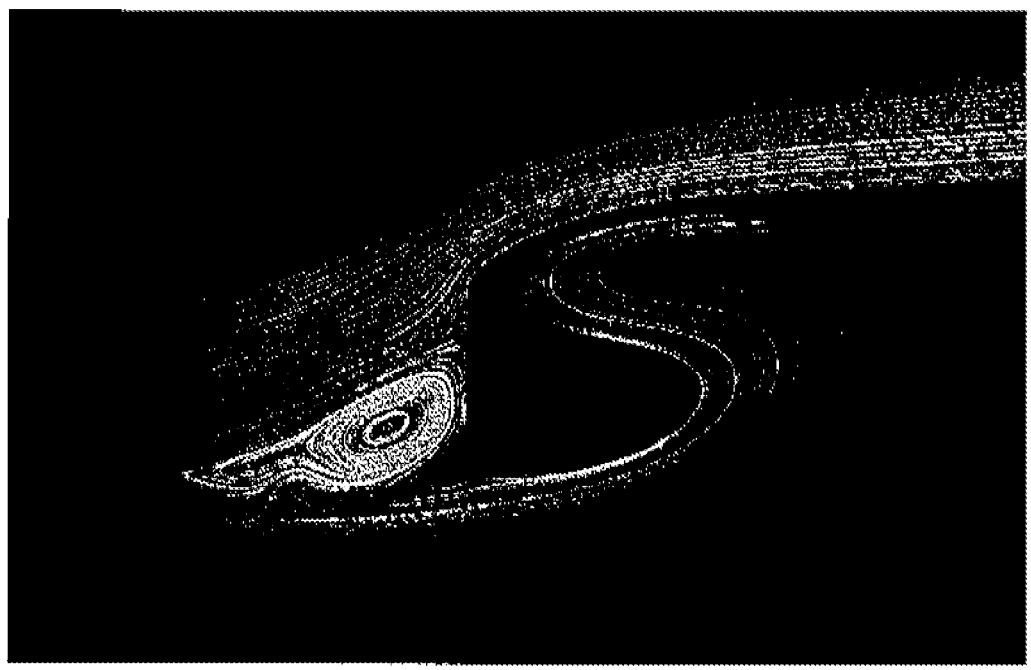
FIG. 24 is a chart of flow lines averaged with respect to time and averaged with respect to circumferential direction around the flanged casing of FIG. 16(a) having the flange height of 10% and the tube length of 22.
Figure 25:
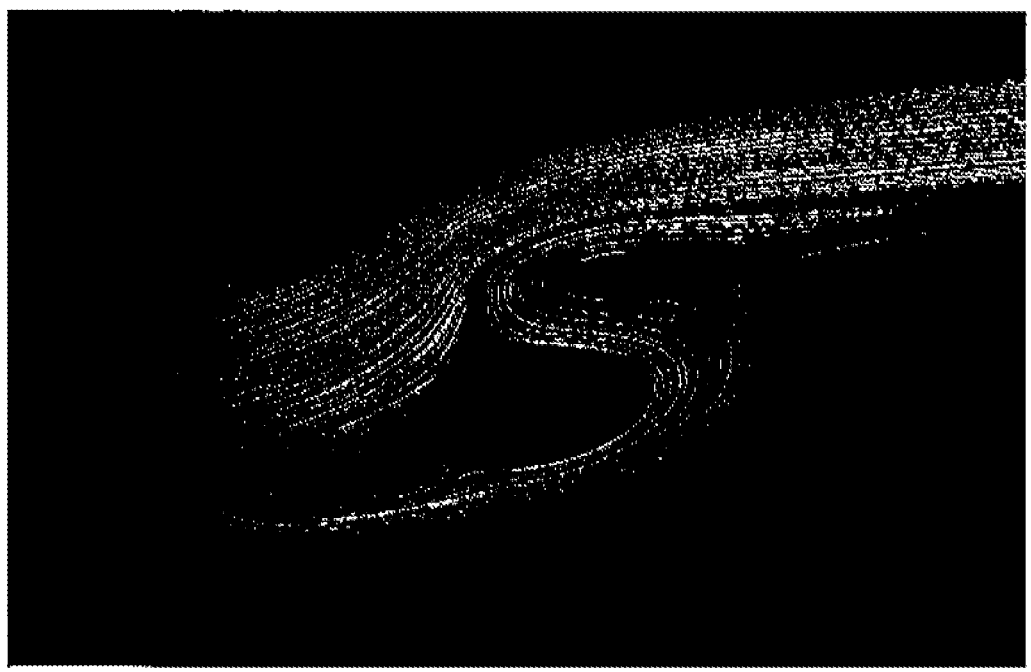
FIG. 25 is a chart of flow lines averaged with respect to time and averaged with respect to circumferential direction around the thick cut end casing of the fluid machine according to Embodiment 3 of the present invention.

Moreover, FIGS. 22 and 23 show the results of the numerical calculations of pressure distribution averaged with respect to time around the wind turbines respectively equipped with the flanged casing having a flange height of 10% and a tube length of 22% and the casing having the banana-shaped cross-section. FIG. 22 shows pressure distribution averaged with respect to time around the wind turbine equipped with the flanged casing having a flange height of 10% and a tube length of 22%, and FIG. 23 shows pressure distribution averaged with respect to time around the wind turbine equipped with the casing having the banana-shaped cross-section. Furthermore, FIG. 24 is a chart of flow lines around the flanged casing having a flange height of 10% and a tube length of 22%, and FIG. 25 is a chart of flow lines around the casing having the banana-shaped cross-section. According to FIGS. 22, 23, 24 and 25, it is found that the negative pressure of the negative pressure region produced by the banana-shaped cross-section is stronger than that produced by the flanged casing having a flange height of 10% and a tube length of 22% and that the negative pressure region is extended wider close to the throat section along the wall surface of the inner circumferential face of the casing. This indicates that the velocity u of the flow at the throat section is increased, whereby the output of the wind turbine is increased.

Figure 26:
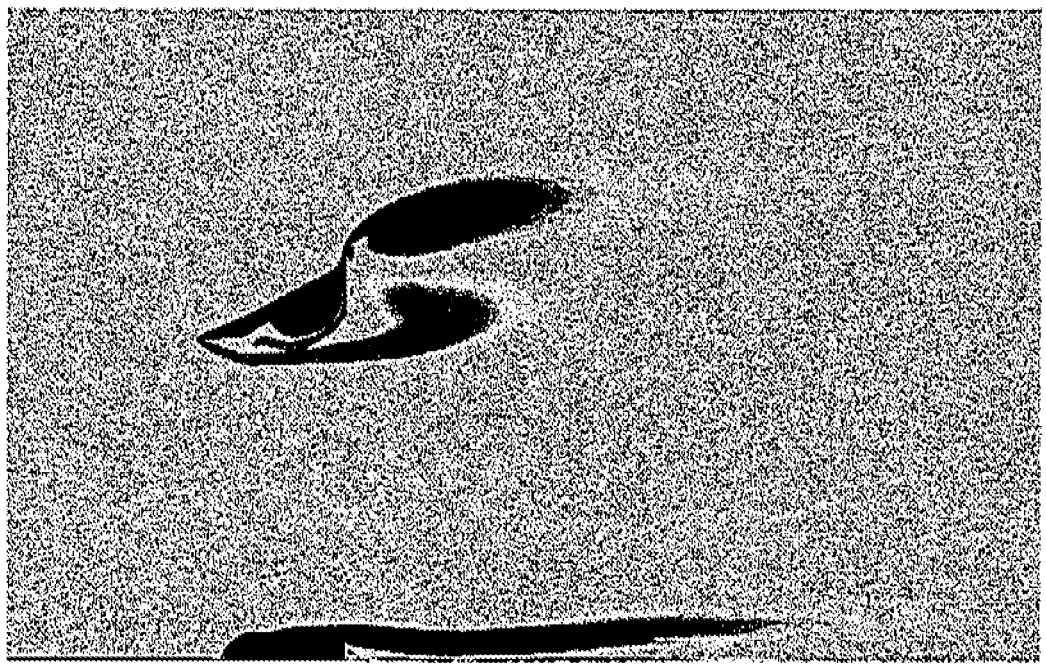
FIG. 26 is a chart of vorticity distribution averaged with respect to time and averaged with respect to circumferential direction around the flanged casing of FIG. 16(a) having the flange height of 10% and the tube length of 22%.
Figure 27:
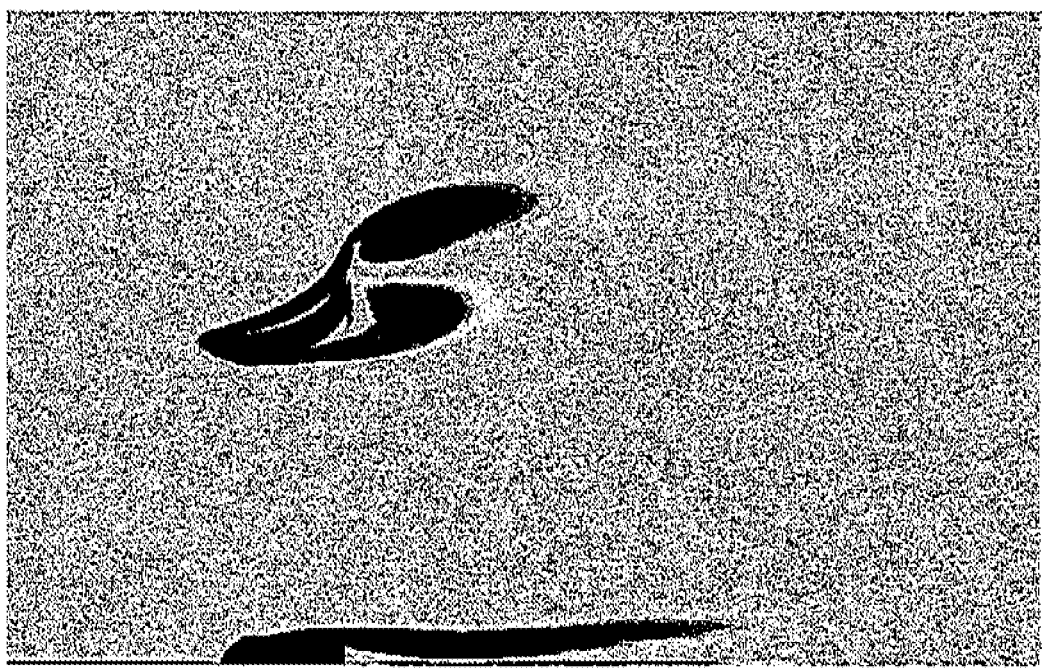
FIG. 27 is a chart of vorticity distribution averaged with respect to time and averaged with respect to circumferential direction in the flow field around the thick cut end casing of the fluid machine according to Embodiment 3 of the present invention.

FIG. 26 is a distribution chart showing vorticity distribution averaged with respect to time and averaged with respect to circumferential direction in the flow field around the flanged casing having a flange height of 10% and a tube length of 22%, and FIG. 27 is a distribution chart showing vorticity distribution averaged with respect to time and averaged with respect to circumferential direction in the flow field around the casing having the banana-shaped cross-section. In the case of the flanged casing having a flange height of 10% and a tube length of 22%, it is found that a portion having high vorticity is formed in the vicinity of the distal end of the impeller on the downstream side as a slightly weak region. On the other hand, in the case of the casing having the banana-shaped cross-section, it is found that a region having very high vorticity is formed close to the rear of the vortex generating face and in the vicinity of the outlet of the wind turbine in the range from the inner circumference to the outer circumference. Hence, the negative pressure region having high vorticity in the banana-shaped cross-section induces the increase in the velocity u of the internal flow.

Figure 28:
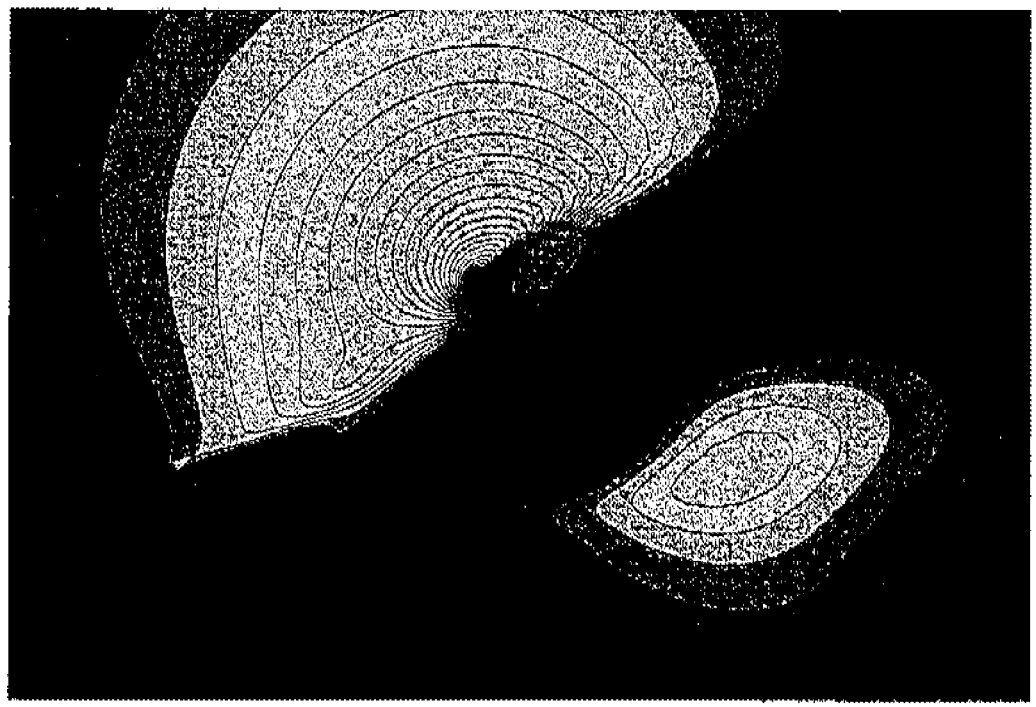
FIG. 28 is a chart of radial velocity component distribution averaged with respect to time and averaged with respect to circumferential direction around the fluid machine equipped with the flanged casing of FIG. 16(a) having the flange height of 10% and the tube length of 22%.
Figure 29:
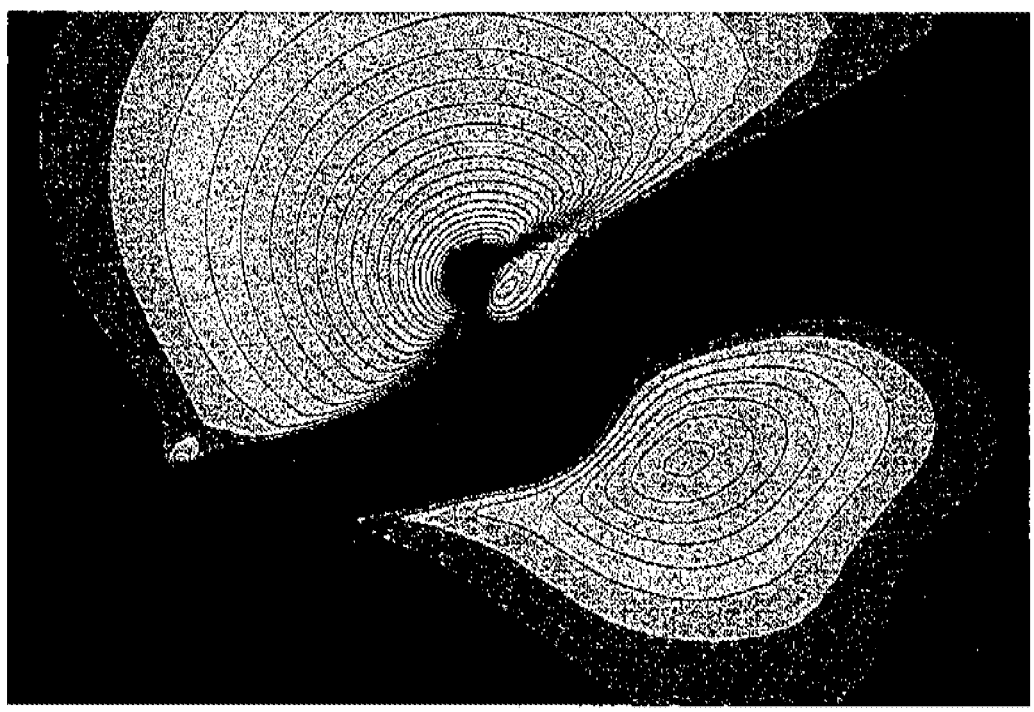
FIG. 29 is a chart of radial velocity component distribution averaged with respect to time and averaged with respect to circumferential direction around the fluid machine according to Embodiment 3 of the present invention.

FIG. 28 is a chart of velocity component distribution in the radial direction averaged with respect to time and averaged with respect to circumferential direction around the wind turbine 1 equipped with the flanged casing having a flange height of 10% and a tube length of 22% shown in FIG. 16(*a*), and FIG. 29 is a chart of velocity component distribution in the radial direction averaged with respect to time and averaged with respect to circumferential direction around the wind turbine 1 equipped with the casing having the banana-shaped cross-section shown in FIG. 16(*b*). According to the figures, the flow around the flanged casing having a flange height of 10% and a tube length of 22% has a stagnant region outside the casing. On the other hand, the main flow of the flow around the casing having the banana-shaped cross-section is not disturbed by the casing, and the jumping out of the flow from the upper face of the rear edge of the casing 2 is smooth and quick in the case of the casing having the banana-shaped cross-section.

A plate-shaped flanged casing having a shape similar to the shape of the inner circumferential face of the casing having the banana-shaped cross-section will herein be described. This shape uses a cycloid curve having a convex portion at the throat section as the main portion of the reference line; however, not only this cycloid curve but also a straight line is used for part of the range from the front end of the vortex generating portion to the rear edge to form the vortex generating portion, and a connection is made between the front edge and the rear edge at the part. At this time, the vortex generating portion is formed into a ring-shaped flange. The cycloid shape is mainly used, and the flange for forming the vortex generating portion is provided partially. The vortex generating portion may be formed by making a connection between the front edge and the rear edge using a second curve having a large radius of curvature. This is used as effective means in the case that strong vortices are required to be formed while the tube length is made small. The flanged casing having a flange height of 10% and a tube length of 22% being used for the comparison with the cycloid casing in Embodiment 3 has excellent characteristics that are closer to those of the cycloid casing and the casing having the banana-shaped cross-section than those of the flanged casing having a flange height of 10% and a tube length of 13.7% being used for the comparison in Embodiments 1 and 2. It is assumed that this is due to various reasons, such as the following reasons. A firsts reason is assumed to be that the cycloid is curved outward in the radial direction on the front edge side, whereby the expansion angle β is made small (more specifically, β<40°). Furthermore, a second reason is assumed to be that the entire contour of the casing with respect to the flow can be deformed into a contour that is configured so that the flow is not disturbed more than required for the formation of vortices by virtue of the curve at the inlet and the decrease in the expansion angle. An unsteady flow can be utilized while avoiding meaningless pressure loss by making the expansion angle β smaller than a predetermined value and by forming the entire contour into an appropriate nonlinear shape. These first and second reasons are mutually related.

With respect to the two casings used for the above-mentioned comparison, the expansion angle β is approximately 42° (the position of the throat section, 0.05d) in the case of the flanged casing having a flange height of 10% and a tube length of 13.7% and approximately 38° (the position of the throat section, 0.89d) in the case of the flanged casing having a flange height of 10% and a tube length of 22%; from the viewpoint of the expansion angle β, 40° is the turning point of the characteristics. More specifically, it is preferable that the expansion angle β be less than 40° so that an unsteady flow is utilized while useless pressure loss is avoided. At β=42°, the vortex flow tends to expand considerably on the downstream side; however, in the case that the expansion angle β of the flanged casing is β<40°, a strong vortex flow that is generated concentratedly behind the vortex generating face 2*c*, similar to those obtained by the cycloid casing and the casing having the banana-shaped cross-section, can be formed. In addition, in the case that the throat section of the cycloid is moved backward to the downstream side of the casing, this leads to not only the improvement in the vortex formation characteristics but also making the casing compact. Furthermore, in the casing having the banana-shaped cross-section and the flanged casing, in the case that the vortex generating face 2*c* formed of the straight line or the second curve is inclined with respect to the axis instead of being formed in the radial direction, a configuration similar to that according to Embodiment 1 is obtained (refer to FIG. 2), a secondary flow having high circularity can be pulled in from the downstream side as in the case of the cycloid casing, and a negative pressure region being more stable and stronger than that formed in the case that the face is perpendicular to the axis is formed.

As described above, in the case that the shape of the casing is changed so as to have a thick cross-section, the thickness of which is increased gradually and decreased suddenly, a negative pressure region having negative pressure stronger than that obtained by the shape of the casing having a constant thickness, such as a plate, can be generated in the vicinity of the casing. The flow is pulled into this negative pressure region, whereby the velocity of the flow at the throat section is increased, and the output of the wind turbine is increased.

Embodiment 4

Although the fluid-dynamic aspect of the wind turbine 1 has been mainly described above, the aspect thereof as a power generation apparatus will be described below. In a wind turbine 1 according to Embodiment 4, as shown in FIG. 30, the rotation force of an impeller 3 is transmitted to a power generator 11, the power generator 11 is driven to generate electricity, and the electricity is supplied to the outside. The wind turbine 1 according to Embodiment 4 is equipped with the casing described in Embodiments 1 to 3. However, the wind turbine 1 is not limited to that equipped with a power generation apparatus. The rotation force may be directly output without using the power generator 11. For example, it may be used as a prime motor and its rotating shaft is connected to the drive shaft of a pump to pump water, to compress gas and accumulate pressure, thereby storing energy in an accumulator, or to drive an agitator to supply warm water, although not shown herein. These are also wind turbines and fluid machines.

In the case of the wind turbine 1, as shown in FIG. 30, the rotation force of the impeller 3 is transmitted to the power generator 11 inside a power generation apparatus 10 via a transmission mechanism, and the power generator 11 generates electricity. As the power generator 11, for example, an induction generator or the like is used. Since the electricity generated by the power generator 11 is AC power, this is supplied to an AC/DC converter 12 and converted into DC power. The converted DC power is charged in a battery 14 by a charger 13. This battery 14 can be used as an emergency power source. The DC power from the AC/DC converter 12 is power-adjusted so as to become predetermined power and then converted into AC power again by a DC/AC converter 15, and the AC power is supplied to a power system 16 as an AC power source. The configuration of the power generation apparatus 10 is just taken as an example and is not limited to this example.

Next, the operation of a controller 17 will be described. A sensor for detecting the rotation speed of the rotor of the power generator detects the rotation speed of the power generator 11, and a gap detector 20 detects the gap between the impeller 3 and the inner circumferential face of the casing. On the basis of the rotation speed, the controller 17 judges whether the rotation speed is excessive; upon judging that the rotation speed is excessive, the controller drives an actuator 18 to lower the output and to move the casing 2 in a direction in which the gap is widened, thereby moving the casing 2 to an optimal position in the axial direction. Even if the rotation speed is still excessive, the rotation speed is lowered using a transmission mechanism 19 having a speed change/clutch function. On the other hand, in the case that the rotation speed of the impeller 3 is low, the gap is controlled using the actuator 18 to an optimal gap at which the maximum output is obtained. The gap has an effect on aerodynamically generated noise; when tip vortices are broken down and the maximum output is obtained, noise can be reduced. In the case that the impeller 3 of a variable pitch type is used, the pitch can be changed by the controller 17 when the wind is strong.

The actuator 18 is not an indispensable member. In the case that the casing 2 is not moved, it is possible that the output is controlled by the controller 17 so as to be processed electrically. Furthermore, the casing 2 is supported on a locking part 18a provided on the support pillar of a support base 22 so as to be slidable in the axial direction of the impeller 3. The casing 2 is slid in the axial direction by extending and contracting the actuator 18. In the case that the casing 2 is not moved, the casing 2 is be secured to the support pillar.

The voltage/current supplied from the AC/DC converter 12 to the DC/AC converter 15 is detected by a voltage/current sensor, not shown, and this signal is input to the controller 17. The controller 17 controls the DC/AC converter 15 on the basis of the detection signal so that the voltage is constant and unchanged. The power after this adjustment is supplied to the power system 16.

The wind turbine 1 according to Embodiment 4 is installed so as to be turnable around the support base 22. The reason for this is that the wind turbine rotates so as to turn to the wind at all times while the left and right fluid forces are balanced by the action of flows. Hence, although the wind turbine according to Embodiment 1 is simple in configuration as described above, its direction can be adjusted automatically to a direction in which the maximum output is obtained.

Since the wind turbine according to Embodiment 4 of the present invention is the wind turbine 1 as described above, the rotation force of the impeller 3 is transmitted to the power generator 11, the power generator 11 is driven to generate electricity, and the electricity is supplied to the outside. A flow for forming vortex streets is formed using the flows inside and outside the casing 2, and the flow is controlled so as to be stable, whereby the velocity of the internal flow is increased and high output power generation can be carried out. Furthermore, the length of the diffuser can be made smaller, whereby not only micro and mini wind turbines of several meters or less but also wind turbines for large wind-power generation apparatuses having a power generation capacity of megawatt can be made large in size, and high output can be obtained. Reinforcement in structure is also possible.

Embodiment 5

A wind turbine 1 according to Embodiment 5 of the present invention is intended to stabilize its flow and to deliver high output, and furthermore to alleviate the effect of the wind turbine 1 to an aviation Doppler radar and to solve the problem of impact due to foreign matter, such as bird strikes. FIG. 31 shows a wind power generation apparatus in which a mesh is installed on the casing according to Embodiments 1 to 3 of the present invention.

Figure 31A:
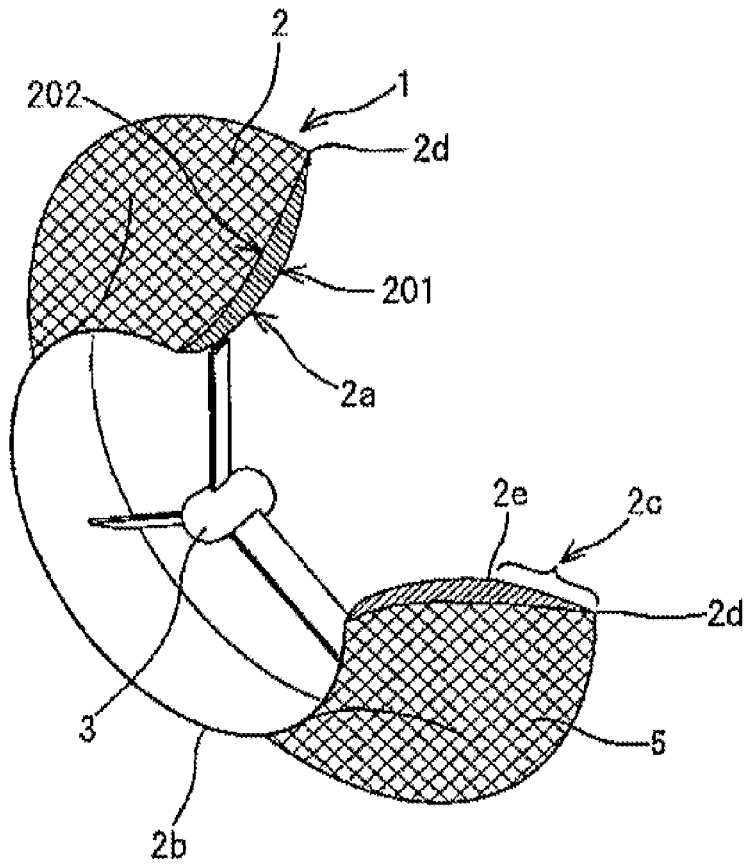
FIG. 31 is an explanatory view of a wind power generation apparatus according to Embodiment 5 of the present invention to which a mesh is attached.
Figure 31B:
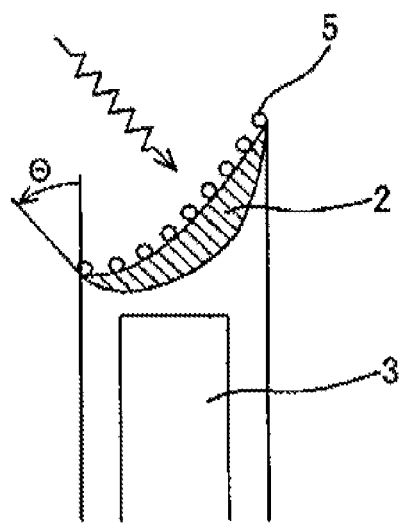

As shown in FIGS. 31(a) and 31(b), a mesh 5 formed of, for example, a wire net formed of wires intersecting at a predetermined pitch, is disposed so as to cover a predetermined range so that the movement of the entire external surface of the casing 2 or the distal end of the impeller is hidden from the radar, and then supported on the casing 2. Disturbance is added to the flow on the external surface by the installation of the mesh 5, whereby a turbulent boundary layer develops on the surface of the casing 2, and the entire flow is stabilized. More specifically, by the installation of the mesh 5, the surface becomes a rough surface similar to that formed by numerous dimples; hence, the secondary flow formed around the wind turbine 1 is stabilized and the main flow is stabilized, whereby the negative pressure region generated behind the vortex generating face is stabilized and accompanied by the casing 2. The installation of the mesh 5 can be performed far more easily than the formation of dimples for the control of the boundary layer.

In the case that the inlet of the casing 2 is covered with a filter formed of a mesh of a wire net or the like to eliminate foreign matters, such as birds, foreign matters can be prevented from colliding with the impeller 3 and from damaging it. In the case that a wire net or the like is provided at the inlet, when the flow including the small-scale disturbance caused by the wire net hits the blade, at a low wind velocity (approximately 6 m/s or less), that is, in a low Reynolds number region, the flow on the surface of the blade flows along the cross-section of the blade in a rather long range (a disturbance boundary layer is apt to develop easily and the flow is not separated from the surface), whereby a high lift force is generated and the wind turbine power generation output coefficient Cw is improved eventually. Since there is an outflow from the outlet side, birds or the like are not sucked in this direction.

A mesh formed of conductors has an effect of shielding the transmission of an electromagnetic wave (microwave) emitted from the radar depending on the size of the mesh. More specifically, there are two cases depending on the size of the mesh; a case in which a microwave passes through the mesh and a case in which a microwave cannot pass through the mesh. Hence, in the case that the mesh size of the mesh 5 is selected, the effect of the wind turbine 1 to the aviation Doppler radar (a frequency of approximately 1.3 GHz, a wavelength of approximately 23 cm) can be alleviated. In other words, it can be expected that a fluid dynamic action and the effect of shielding electromagnetic waves are obtained.

Hence, a mesh size capable of shielding a microwave will be described below. Two methods are used for experiments. A first experimental method uses a sport speed gun for measuring the speed of a moving object. The sport speed gun can measure the movement of the moving object by applying a microwave. As a speed gun for use in the experiments, a commercially available Sports Radar Tracer Model SRA3000 (made by Sports Radar, Ltd.) was used. It uses a microwave having a frequency of approximately 10.525 GHz and a wavelength of approximately 2.85 cm.

In the first experiment, the effect of shielding an electromagnetic wave depending on the mesh size of the mesh 5 was examined (at Test 1), and the relationship between the irradiation angle of a microwave with respect to the rotation shaft of the impeller 3 and an electromagnetic wave shielding effect was examined (at Test 2). The mesh sizes of the mesh 5 used for Test 1 are 3 mm and 12 mm. A cycloid casing made of FRP is used as the casing 2. The inside diameter of the casing is 1000 mm. In the case that a wire net is installed, it is disposed around the side face of the casing, and the microwave is applied to the position of the radius, 450 mm, of the impeller while the wire net is placed therebetween.

As Test 1, an experiment was conducted in the case that no wire net was installed and in the cases that wire nets having mesh sizes of 3 mm and 12 mm were installed. In the case that no wire net was installed, the speed gun measured a speed of 52.8 km/h at a rotation speed of 300 rpm. Since the rotation speed of 300 rpm is assumed to be approximately 50.8 km/h at this position, the two values are almost identical. More specifically, in the case that no wire net is installed, the microwave passes through the casing.

Furthermore, in the case that the wire net having a mesh size of 12 mm was disposed between the speed gun and the casing, the rotation speed was able to be measured as in the case that no wire net was installed, and the rotation speed was almost identical. Hence, the microwave passes through the casing 2 even when the wire net having a mesh size of 12 mm was disposed. However, in the case that the wire net having a mesh size of 3 mm was disposed, the rotation speed was unable to be measured by the speed gun. This means that the applied microwave was reflected by the mesh and the rotation speed at the distal end of the impeller was unable to be detected using the Doppler effect, and also means that the microwave was unable to pass through the wind turbine.

Then, as Test 2, an experiment was conducted to examine the relationship between the irradiation angle of the microwave with respect to the rotation shaft of the impeller and the electromagnetic wave shielding effect. Test 2 is intended to measure the rotation speed in a state in which as shown in FIG. 31(*b*) an angle $\Theta$ is increased gradually while the direction orthogonal to the rotation shaft of the impeller, that is, the direction parallel with the rotation plane thereof, is set to 0°. $\Theta=0°$ indicates the direction orthogonal to the rotation shaft, $\Theta=90°$ indicates the direction of the rotation shaft as viewed from the upstream side, and $\Theta=-90°$ indicates the direction of the rotation shaft as viewed from the downstream side. According to the results of the measurement, when the angle $\Theta$ was larger than 10°, the rotation speed of the impeller 3 was unmeasurable regardless of whether the wire net was present or not. More specifically, the Doppler effect due to the impeller 3 is not produced unless the direction is considerably oblique with respect to the rotation shaft (unless the angle exceeds approximately 80° and becomes close to 90° as viewed from the direction of the rotation shaft). This means that the movement at the distal end of the impeller was hidden from the radar by the mesh.

In the casing having an inside diameter of 1000 mm and used for the experiments, the distance from the front edge of the impeller to the inlet end of the casing is 90 mm; hence, if the angle $\Theta$ is 10.6° or less from the upstream side of the casing, the impeller is hidden inside the casing 2 when a microwave having a directivity is used, and the microwave is applied to the casing and does not pass through it. Similarly, since the distance from the rear edge of the impeller to the outlet end of the casing 2 is 145 mm, if $\Theta$ is 16.2° or less from the downstream side of the casing, the microwave is applied to the casing and does not pass through it. In the range of $\Theta$=within ±10° in the displacement of the casing and the impeller of the wind turbine, the width of the impeller in the axial direction can be covered sufficiently. This angle is reasonable for almost all wind turbines because of the similarity in the shapes of large and small wind turbines. The range corresponds to the entire external surface of the casing or part thereof in which the movement of the distal end of the impeller can be shielded from the radar. Hence, in the case that a mesh formed of a conductor, such as a metal, is disposed in the range of the angle $\Theta$ around the casing from $\Theta=-10°$ to $\Theta=+10°$, an effect of not generating the Doppler effect due to the microwave of the radar from all directions can be obtained. However, this is possible under the condition that the mesh size is smaller than a predetermined size.

Next, a second experiment was conducted. The same wind turbine as that used in the first experiment was used. In the second experiment, a wire net is installed around the casing and the transmission intensity of a microwave from the aviation Doppler radar is measured actually. As the method of the second experiment, a microwave (a frequency of approximately 1.3 GHz, a wavelength of approximately 23 cm) having almost the same wavelength as that of the Doppler radar was used, a wideband horn antenna was used on each of the irradiation side and the reception side, an object to be measured was disposed between the irradiation side and the reception side, and the object was measured. A vector network analyzer was used for the intensity analysis and the frequency analysis of the microwave. The influence of scattering was eliminated as much as possible so that only the values of the microwave directly reached could be evaluated.

In the second experiment, the transmission property of the microwave depending on the presence/absence of the wire net was measured (at Test 1), the wind turbine was set between a transmitter and a receiver so that the rotation plane of the impeller was parallel and the transmission intensity of the microwave was examined depending on the presence/absence of the wire net (at Test 2). At Test 1, the measurement was made only depending on the presence/absence of the wire net while a distance of 1 m was given between the transmitter and the receiver. Four kinds of wire net meshes (made of iron) were used. Furthermore, at Test 2, the wind turbine was set between the transmitter and the receiver while a distance of 2 m was given between the transmitter and the receiver, and the transmission intensity of the microwave was measured depending on the presence/absence of the wire net. Similarly, the four kinds of wire net meshes (made of iron) were used. The wind turbine (however, the impeller thereof was stationary) was installed, and an experiment similar to that of Test 1 was conducted.

The following (Table 1) and (Table 2) indicate the measured transmission intensity, that is, the intensity of the microwave on the receiver side. The transmission intensity lowers to a half at the decrease of −3 dB and lowers to a quarter at the decrease of −6 dB.

TABLE 1

| Mesh Size (cm) | Measured Value | Reduced Amount | Reduction in Microwave Intensity |
|---|---|---|---|
| No Mesh | −18.8 dB | | |
| 15 | −20.4 dB | −1.6 dB | Reduced to approx. 2/3 |
| 10 | −20.6 dB | −1.8 dB | Reduced to approx. 2/3 |
| 5 | −22.5 dB | −3.7 dB | Reduced to approx. 40% |
| 1 | −44.3 dB | −25.5 dB | Reduced to about 1/300 |

TABLE 2

| Mesh Size (cm) | Measured Value | Reduced Amount | Reduction in Microwave Intensity |
|---|---|---|---|
| No Mesh | −25.6 dB | | |
| Wind Turbine Only | −25.3 dB | +0.3 dB | Almost transmitted |
| Wind Turbine + 5 cm Mesh | −29.1 dB | −3.5 dB | Reduced to about 40% |
| Wind Turbine + 1 cm Mesh | −34.4 dB | −8.8 dB | Reduced to approx. 1/8 |

The following is found through two experiments, the first and second experiments described above. In the case of a small wind turbine, if the irradiation angle is within ±10° from the rotation plane of the blade, the radar wave being strong in directivity is applied to the casing.

More specifically, in the case that no wire net mesh is installed, a microwave of 1.0 to 10 GHz (a wavelength of 3 to 25 cm) applied to the range within an angle ±10° passes through the casing of the wind turbine made of a resin (FRP) without attenuation. Hence, in this case, with the apparatus for the second experiment, the rotation of the impeller of the wind turbine can be recognized as the movement of an object by the Doppler radar. However, in the case that the irradiation is performed at an angle beyond the range of ±10°, the rotation of the impeller that is approaching and departing cannot be recognized as the movement of an object, and the rotation of the impeller cannot be recognized as the movement of an object, whereby the measurement using the Doppler effect becomes impossible.

On the other hand, in the case that a wire net mesh is installed in the range of ±10° on the outside of the casing of the wind turbine, the intensity of the microwave attenuates significantly. According to (Table 1) and (Table 2), the mesh size capable of attaining attenuation is approximately 20% or less of the wavelength of the microwave to be applied. In consideration of the wavelength, λ=approximately 23 cm, of the microwave used, when a wire net mesh having a size (5 cm) amounting to approximately 20% of the wavelength of the microwave is used, the intensity of the microwave can be decreased to approximately 40%. However, this is affected by the arrival distance of the microwave to the wind turbine. Furthermore, when the mesh size becomes smaller, the weight to be supported by the wind turbine increases. For the purpose of suppressing the weight of the mesh, it is preferable that the mesh size be suppressed in the range of up to 10% of the wavelength of the radar.

Hence, in a wind turbine having a casing formed to enclose the rotation of the blades, in the case that a conductor mesh having an appropriate mesh size (10 to 20% of the wavelength of the radar) is installed on the external surface of the casing, the problem of the false recognition by the aviation Doppler radar can be prevented. In the wind turbine, the specific size of the wire net mesh amounting to 10 to 20% of the wavelength of the radar is 2.5 to 5 cm.

As described above, wind power generation apparatuses are required to be upgraded promptly in the future. If the installation environment thereof is limited in such circumstances, the upgrading will be delayed. In the wind power generation apparatus according to Embodiment 5 of the present invention, even if the wind power generation apparatus is installed near an airport, the influence of the wind turbine to the aviation Doppler radar cab be eliminated. The countermeasure for the influence on the aviation Doppler radar, a difficult problem in the past, can be accomplished at very low cost by using the simple method of installing the mesh. The flow around the casing can also be stabilized. Moreover, in the wind power generation apparatus according to Embodiment 5, the problem of breakage due to bird strikes or the like can be solved very easily by installing a filter on the casing.

Embodiment 6

Figure 32:
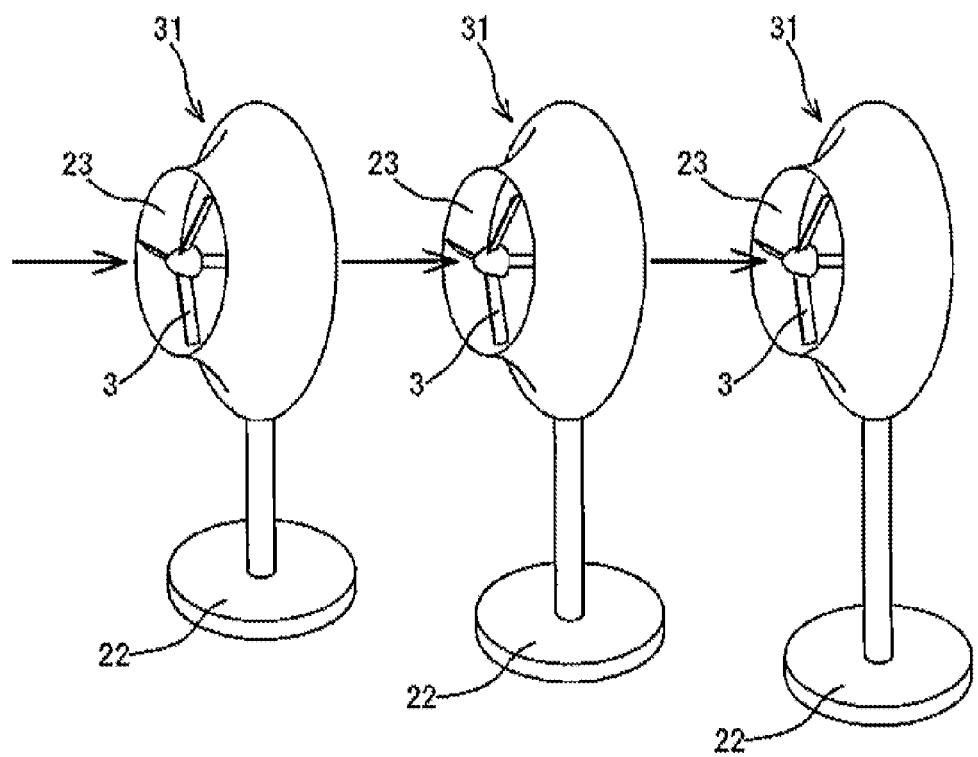
FIG. 32 is an external view of a tidal power generator according to Embodiment 6 of the present invention.

The following will describe a fluid machine utilizing an unsteady flow according to Embodiment 6 of the present invention, particularly, a hydraulic machine, such as a hydraulic turbine, more particularly, a tidal power generator capable of generating electricity using tides. FIG. 32 shows the external appearance of a tidal power generator equipped with the casing according to Embodiments 1 to 3 of the present invention.

As shown in FIG. 32, the support base 22 of a tidal power generator 31 is installed on the sea bed so as to be rotatable at a place where the flow of an ocean current is strong. A plurality of the apparatuses are installed so as to be arranged in a line side by side in a direction orthogonal to the main current. It is preferable that the impeller be set to a height not significantly affected by the influence of the sea surface. In the case that the direction of the ocean current at high tide is different from that at low tide, the tidal power generator 31 can rotate and turn to the direction of the flow by virtue of the action of the flow. The controller 17 may be used to lock the rotation to prevent incessant small rotation. The configuration of the tidal power generator 31 is similar to that of the wind turbine 1 shown in FIG. 28.

Furthermore, the tidal power generator 31 can be installed by using a method of suspending the support base 22 above the sea surface instead of using the method for installing it on the sea bed. The tidal power generator 31 may be provided with the actuator 18 or the casing 23 thereof may be supported around the power generator 11, for example. Moreover, all the components including the main sections of the power generation apparatus 10 and the actuator 18 can be installed above the sea surface. Still further, the above description is also applicable similarly to hydraulic turbines that are used in dams, rivers, etc. other than the hydraulic turbines that are operated using a tidal current; in this case, the method for supporting the casing may be changed variously depending on the usage.

Since the fluid machine according to Embodiment 6 of the present invention is the tidal power generator 31, the rotation force of the impeller 3 by virtue of a tidal current drives the power generation apparatus 10 to generate electricity, and the electricity can be supplied to the outside. Furthermore, the casing 31 also serves to reinforce the structure.

The method for increasing the velocity of the internal flow of the fluid machine utilizing an unsteady flow according to the present invention can also be used for fluid machines other than the fluid machines, such as the wind turbines and hydraulic machines, described above. For example, in a performance testing apparatus for testing the performance of a jet engine in the atmosphere, a casing is provided around its nacelle and a rotor provided therein is rotated, whereby the volume of the wind sucked into the suction port of the jet engine can be increased. Consequently, a high performance testing apparatus can be obtained.

INDUSTRIAL APPLICABILITY

The present invention is applicable to a fluid machine operating in flows along the inside and outside of the casing of a wind power generation apparatus, more particularly, a wind power generation apparatus to be used near an airport and a tidal power generator, for example.

EXPLANATIONS OF REFERENCE SIGNS

1 Wind Turbine
2 Casing
2a Throat Section
2b Front Edge
2c Vortex Generating Face
2d Rear Edge
2e Front End of Vortex Generating Portion 3 Impeller
4 Phase Control Plate
5 Mesh
10 Power Generating Apparatus
11 Power Generator
12 AC/DC Converter
13 Charger
14 Battery
15 DC/AC Converter
16 Electric Power System
17 Controller
18 Actuator
18a Locking Part
19 Transmission Mechanism
20 Gap Detector
22 Support Base
23 Casing
31 Tidal Power Generator
201 Inner Circumferential Face
202 Outer Circumferential Face
h Radial Height of Vortex Generating Face
d Throat Section Diameter
$d_c$ Cylinder Diameter
D Projected Width
Lt Tube Length
S Negative Pressure Region
v Vortex Street
α Gradient
β Expansion Angle
θ1 Outflow Gradient
θ2 Outflow Gradient
θm Reference Value
Θ Angle
m Cycloid Curve
i Internal Curve
k External Curve
n Generatrix Line
p Tangent Line
q Tangent Line
A Convex Portion
A' Convex Portion
Δ Thickness
$Δ_i$ Inner Thickness
$Δ_k$ Outer Thickness

The invention claimed is:

1. A fluid machine utilizing an unsteady flow, the fluid machine comprising a casing having an annular shape and an axial cross-section of a non-streamline shape, and an impeller disposed at a throat section inside the casing to rotate around an axis, wherein the fluid machine is configured to split a surrounding flow into an internal flow and an external flow at a front edge and to force the flows to cause separations, such that vortex streets are formed downstream of the casing by the separations, and a negative pressure region having a cell structure in an annular direction is formed by the vortex streets and vortex street fluctuations, whereby a velocity of the internal flow inside the casing is increased, wherein a reference line serving as a reference for forming the thickness of the casing connects the front edge and a rear edge in the axial cross-section, and includes a cycloid curve having a convex portion at the throat section between the front and rear edges, the throat section and a vortex generating portion disposed downstream of the throat section to generate the negative pressure region are formed on a radially inner circumferential face of the casing, a first outflow gradient is formed on an outer circumferential face of the casing and at the rear edge to separate the external flow at the rear edge, and a second outflow gradient is formed on a throat-side adjacent face adjacent to the vortex generating portion and at a boundary between the throat-side adjacent face and the vortex generating portion to separate the internal flow, the first outflow gradient is equal to or larger than a gradient of a conical generatrix line connecting the front edge and the rear edge, and the second outflow gradient is equal to or smaller than a reference gradient, the reference gradient being a gradient of a front end of the vortex generating portion when the reference cycloid curve forms the inner circumferential face, and the negative pressure region of high vorticity is generated behind the vortex generating portion by virtue of the non-streamline shaped casing to increase the velocity of the internal flow.

2. The fluid machine utilizing an unsteady flow according to claim 1, wherein when the front edge and the rear edge have a thickness of a given width in a radial direction in the axial cross-section, an inner circumferential shape of the casing, including the vortex generating portion, is formed by the reference cycloid curve connecting the front edge and the rear edge on an inner circumferential side.

3. The fluid machine utilizing an unsteady flow according to claim 1, wherein the casing is formed of a plate having a given thickness, the reference line includes the cycloid curve having the convex portion at the throat section between the front edge and the front end of the vortex generating portion, and a straight line or a second curve for forming the vortex generating portion between the front end of the vortex generating portion and the rear edge, to connect the front edge and the rear edge, and the gradient of the conical generatrix line connecting the front edge and the rear edge is a positive gradient smaller than 40°.

4. The fluid machine utilizing an unsteady flow according to claim 1, wherein the non-streamline shape is formed such that the thickness in the axial cross-section increases gradually and then decreases gradually or increases gradually and then decreases suddenly, and portion or all of an inner circumferential side of the non-streamline shape is the reference cycloid curve.

5. The fluid machine utilizing an unsteady flow according to claim 2, wherein when only the rear edge of the front and rear edges has a thickness of a given width in a radial direction in the axial cross-section, the vortex generating portion is a ring-shaped flat face having the given width.

6. The fluid machine utilizing an unsteady flow according to claim 1, wherein a plurality of phase control plates are provided on the vortex generating portion to adjust a phase of the vortex street fluctuations in the flow.

7. The fluid machine utilizing an unsteady flow according to claim 1, wherein a power generating apparatus is connected to the impeller to converting a rotation force of the impeller into an electric force.

8. The fluid machine utilizing an unsteady flow according to claim 1, wherein a mesh made of a conductor is attached on the casing.

9. A wind turbine comprising a casing having an annular shape and an axial cross-section of a non-streamline shape, and an impeller disposed at a throat section inside the casing to rotate around an axis, wherein wind turbine is configured to split a surrounding flow into an internal flow and an external flow at a front edge and to force the flows to cause separations, such that vortex streets are formed downstream of the casing by the separations, and a negative pressure region having a cell structure in an annular direction is formed by the vortex streets and vortex street fluctuations, whereby a velocity of the internal flow inside the casing is increased, wherein a reference line serving as a reference for forming the thickness of the casing connects the front edge and a rear edge in the axial cross-section, and includes a cycloid curve having a convex portion at the throat section between the front and rear edges, the throat section and a vortex generating portion disposed downstream of the throat section to generate the negative pressure region are formed on a radially inner circumferential face of the casing, a first outflow gradient is formed on an outer circumferential face of the casing and at the rear edge to separate the external flow at the rear edge, and a second outflow gradient is formed on a throat-side adjacent face adjacent to the vortex generating portion and at a boundary between the throat-side adjacent face and the vortex generating portion to separate the internal flow, the first outflow gradient is equal to or larger than a gradient of a conical generatrix line connecting the front edge and the rear edge, and the second outflow gradient is equal to or smaller than a reference gradient, the reference gradient being a gradient of a front end of the vortex generating portion when the reference cycloid curve forms the inner circumferential face, and the negative pressure region of high vorticity is generated behind the vortex generating portion by virtue of the non-streamline shaped casing to increase the velocity of the internal flow.

10. The wind turbine according to claim 9, wherein when the front edge and the rear edge have a thickness of a given width in a radial direction in the axial cross-section, an inner circumferential shape of the casing, including the vortex generating portion, is formed by the reference cycloid curve connecting the front edge and the rear edge on an inner circumferential side.

11. The wind turbine according to claim 9, wherein the casing is formed of a plate having a given thickness, the reference line includes the cycloid curve having the convex portion at the throat section between the front edge and the front end of the vortex generating portion, and a straight line or a second curve for forming the vortex generating portion between the front end of the vortex generating portion and the rear edge, to connect the front edge and the rear edge, and the gradient of the conical generatrix line connecting the front edge and the rear edge is a positive gradient smaller than 40°.

12. The wind turbine according to claim 9, wherein the non-streamline shape is formed such that the thickness in the axial cross-section increases gradually and then decreases gradually or increases gradually and then decreases suddenly, and a portion or all of an inner circumferential side of the non-streamline shape is the reference cycloid curve.

13. The wind turbine according to claim 10, wherein when only the rear edge of the front and rear edges has a thickness of a given width in a radial direction in the axial cross-section, the vortex generating portion is a ring-shaped flat face having the given width.

14. The wind turbine according to claim 9, wherein a plurality of phase control plates are provided on the vortex generating portion to adjust a phase of the vortex street fluctuations in the flow.

15. The wind turbine according to claim 9, wherein a power generating apparatus is connected to the impeller to converting a rotation force of the impeller into an electric force.

16. The wind turbine according to claim 9, wherein a mesh made of a conductor is attached on the casing.

17. A method for increasing a velocity of an internal flow by utilizing an unsteady flow, the method comprising providing an impeller inside a casing having an annular shape and having an axial cross-section of a non-streamline shape, splitting a surrounding flow into an internal flow and an external flow at a front edge and to force the flows to cause separations, forming vortex streets downstream of the casing by the separations, and forming a negative pressure region having a cell structure in an annular direction by the vortex streets and vortex street fluctuations, thereby increasing the velocity of the internal flow inside the casing, the method further comprising:

forming a reference line serving as a reference for forming the thickness of the casing as a cycloid curve connecting the front edge and a rear edge in the axial cross-section and having a convex portion at a throat section between the front and rear edges, forming the throat section and a vortex generating portion on a radially inner circumferential face of the casing, the vortex generating portion being downstream of the throat section to generate the negative pressure region, forming a first outflow gradient on an outer circumferential face of the casing and at the rear edge to separate the external flow at the rear edge, forming a second outflow gradient on a throat-side adjacent face adjacent to the vortex generating portion and at a boundary between the throat-side adjacent face and the vortex generating portion to separate the internal flow, setting the first outflow gradient to be equal to or larger than a gradient of a conical generatrix line connecting the front edge and the rear edge, setting the second outflow gradient to be equal to or smaller than a reference gradient, the reference gradient being a gradient of a front end of the vortex generating portion when the reference cycloid curve forms the inner circumferential face, and generating the negative pressure region having high voracity behind the vortex generating portion by virtue of the non-streamline shaped casing to increase the velocity of the internal flow.

* * * * *